United States Patent
Oya et al.

(10) Patent No.: US 9,257,697 B2
(45) Date of Patent: Feb. 9, 2016

(54) POSITIVE ELECTRODE MATERIAL, MANUFACTURING METHOD THEREOF, POSITIVE ELECTRODE FOR NON-AQUEOUS RECHARGEABLE BATTERY, AND NON-AQUEOUS RECHARGEABLE BATTERY

(75) Inventors: Masayuki Oya, Kyoto (JP); Mitsuhiro Kishimi, Kyoto (JP); Satoshi Kono, Kyoto (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 15 days.

(21) Appl. No.: 13/580,891

(22) PCT Filed: Jan. 13, 2011

(86) PCT No.: PCT/JP2011/050446
§ 371 (c)(1),
(2), (4) Date: Aug. 23, 2012

(87) PCT Pub. No.: WO2011/105126
PCT Pub. Date: Sep. 1, 2011

(65) Prior Publication Data
US 2012/0321948 A1    Dec. 20, 2012

(30) Foreign Application Priority Data
Feb. 24, 2010   (JP) .................. 2010-038065

(51) Int. Cl.
*H01M 4/525* (2010.01)
*H01M 4/131* (2010.01)
(Continued)

(52) U.S. Cl.
CPC ............ *H01M 4/131* (2013.01); *H01M 4/0404* (2013.01); *H01M 4/366* (2013.01);
(Continued)

(58) Field of Classification Search
CPC ............ Y02E 60/122; H01M 10/0525; H01M 2004/028; H01M 4/131; H01M 4/391; H01M 4/505; H01M 4/525; H01M 4/366; H01M 10/7011
See application file for complete search history.

(56) References Cited

U.S. PATENT DOCUMENTS

| 5,679,481 A | 10/1997 | Takanishi et al. |
| 6,337,132 B1 | 1/2002 | Kajiyama et al. |

(Continued)

FOREIGN PATENT DOCUMENTS

| JP | 9-17430 A | 1/1997 |
| JP | 10-125307 A | 5/1998 |

(Continued)

OTHER PUBLICATIONS

English machine translation of Nagura JP 2007-018874, Jan. 2007.*
(Continued)

*Primary Examiner* — Ula C Ruddock
*Assistant Examiner* — Lisa S Park
(74) *Attorney, Agent, or Firm* — Birch, Stewart, Kolasch & Birch, LLP

(57) ABSTRACT

A positive electrode material that can form a positive electrode mixture containing composition with reduced changes over time and high productivity, a manufacturing method thereof, a non-aqueous rechargeable battery less likely to swell and having a high storage characteristic during storage at high temperatures, and a positive electrode that can form the battery are provided. The object is solved by providing a positive electrode material having a coating layer of an organic silane compound on a surface of a positive electrode active material made of a lithium nickel composite oxide represented by the general compositional formula (1): $Li_{1+x}MO_2$ where $-0.5 \leq x \leq 0.5$, M represents a group of at least two elements including at least one of Mn and Co and Ni, and $20 \leq a < 100$ and $50 \leq a+b+c \leq 100$ when the ratios (mol %) of Ni, Mn, and Co in the elements forming M are a, b, and c, respectively.

13 Claims, 2 Drawing Sheets

(51) Int. Cl.
H01M 4/04 (2006.01)
H01M 4/36 (2006.01)
H01M 4/505 (2010.01)
H01M 4/62 (2006.01)
H01M 10/0525 (2010.01)
H01M 4/1391 (2010.01)
H01M 4/02 (2006.01)

(52) U.S. Cl.
CPC ............ *H01M 4/505* (2013.01); *H01M 4/525* (2013.01); *H01M 4/62* (2013.01); *H01M 10/0525* (2013.01); *H01M 4/1391* (2013.01); *H01M 2004/028* (2013.01); *Y02E 60/122* (2013.01); *Y02T 10/7011* (2013.01)

(56) References Cited

U.S. PATENT DOCUMENTS

| 2003/0118905 A1 | 6/2003 | Fukuoka et al. | |
| 2005/0042503 A1* | 2/2005 | Kim et al. | 429/137 |
| 2007/0048607 A1* | 3/2007 | Nakashima et al. | 429/209 |
| 2008/0268338 A1* | 10/2008 | Lee et al. | 429/218.1 |
| 2009/0136854 A1* | 5/2009 | Nakura | 429/342 |

FOREIGN PATENT DOCUMENTS

| JP | 10-162830 A | 6/1998 |
| JP | 11-135123 A | 5/1999 |
| JP | 2000-21407 A | 1/2000 |
| JP | 2000-281354 A | 10/2000 |
| JP | 2002-373653 A | 12/2002 |
| JP | 2004-63433 A | 2/2004 |
| JP | 2007-18874 A | 1/2007 |

OTHER PUBLICATIONS

English machine translation of Gosho JP2000-327339, Nov. 2000.*
International Search Report for PCT/JP2011/050446 mailed on Apr. 5, 2011.
The Notification of Reason(s) for Refusal (including an English translation), dated Aug. 19, 2014, issued in the corresponding Japanese Patent Application No. 2012-501698.
Japanese Office Action, dated Apr. 7, 2015, for Japanese Application No. 2012-501698, including an English translation.

* cited by examiner

POSITIVE ELECTRODE MATERIAL, MANUFACTURING METHOD THEREOF, POSITIVE ELECTRODE FOR NON-AQUEOUS RECHARGEABLE BATTERY, AND NON-AQUEOUS RECHARGEABLE BATTERY

TECHNICAL FIELD

The present invention relates to a positive electrode material for use in a non-aqueous rechargeable battery, a manufacturing method thereof, a positive electrode for a non-aqueous rechargeable battery, and a non-aqueous rechargeable battery.

BACKGROUND ART

In recent years, there has been a sharply increasing demand for high energy density, non-aqueous rechargeable batteries as portable electronic equipment such as cell phones and note type personal computers have developed and electric automobiles have become commercially available. Today, non-aqueous rechargeable batteries that could satisfy the demand use a wide variety of positive electrode active materials including lithium cobalt oxides such as lithium cobaltate ($LiCoO_2$), lithium nickel composite oxides such as lithium nickelate ($LiNiO_2$) and lithium manganese composite oxides such as lithium manganite ($LiMn_2O_4$).

Among the above, lithium nickelate having a greater discharge capacity than lithium cobaltate has been expected as a positive electrode active material that could form inexpensive high energy density batteries with reduced use of cobalt whose reserves are limited.

However, lithium nickelate has a less stable crystal structure than that of lithium cobaltate in a charged state and cannot be used to make sufficiently safe batteries as it is. In addition, as for a charge/discharge cycle life, the batteries produced using lithium nickelate do not provide satisfactory properties because of the low reversibility of the crystal structure of lithium nickelate.

In view of the circumstances, the use of lithium nickel composite oxides having a part of Ni substituted by an element such as Co, Al and Y has been proposed in order to maintain the crystal structure of lithium nickelate in a charged state, and there have been attempts to improve the safety and reversibility (see for example Patent Document 1).

However, when a positive electrode mixture that contains the lithium nickel composite oxide described above, a conduction aid, and a binder is dispersed in a solvent and prepared into a slurry or paste type positive electrode mixture containing composition, and the composition is applied on one or both surfaces of a collector made of a metal foil, followed by drying to form a positive electrode mixture layer, gelation of the positive electrode mixture containing composition is more likely to proceed, which results in a loss in the productivity of the positive electrode and hence a loss in the productivity of the non-aqueous rechargeable battery since the pot-life of the positive electrode mixture containing composition during producing the positive electrode is short.

The positive electrode active material is prone to adsorb moisture, and the adsorbed moisture must be removed for example by vacuum drying before the material is used, or otherwise a gas generated by a reaction with an electrolytic solution could make a battery swell during storage. This could significantly reduce the charge/discharge cycle characteristic of the battery in some cases.

In order to prevent the above-described problems related to the lithium containing composite oxide, it has been proposed to treat a surface of a positive electrode active material with a silane coupling agent (Patent Document 2). However, it has been found based on the inventors' studies that properties or the like of a lithium containing composite oxide in treatment greatly change the effects.

PRIOR ART DOCUMENTS

Patent Documents

Patent Document 1: JP-A 11-135123
Patent Document 2: JP-A 10-125307

DISCLOSURE OF THE INVENTION

The present invention was made in view of the above-described problems and it is an object of the present invention to provide a positive electrode material that can form a positive electrode mixture containing composition with reduced changes over time during the manufacture of a positive electrode and high productivity, a manufacturing method thereof, a positive electrode for a non-aqueous rechargeable battery including the positive electrode material, and a non-aqueous rechargeable battery having the positive electrode with reduced swelling during storage at high temperatures and a high storage characteristic.

The positive electrode material according to an embodiment of the present invention is a positive electrode material for use in a positive electrode for a non-aqueous rechargeable battery and includes a positive electrode active material, a coating layer and an alkaline component. The positive electrode active material includes a lithium nickel composite oxide represented by the following general compositional formula (1)

$$Li_{1+x}MO_2 \quad (1)$$

where $-0.5 \leq x \leq 0.5$, M represents a group of at least two elements including at least one of Mn and Co and Ni and $20 \leq a < 100$ and $50 \leq a+b+c \leq 100$ when the ratios (mol %) of Ni, Mn and Co in the elements forming M are a, b, and c, respectively. The coating layer is formed on a surface of the positive electrode active material and made of an organic compound. The alkaline component has a content of 0.01% to 2%.

The positive electrode material according to the embodiment of the invention further includes elemental sulfur contained in a layer between positive electrode active materials.

Furthermore, the positive electrode for a non-aqueous rechargeable battery according to the embodiment of the invention has a positive electrode mixture layer that includes the positive electrode material according to the embodiment of the invention, a positive electrode collector, and a binder.

Furthermore, a non-aqueous rechargeable battery according to the embodiment of the present invention includes the positive electrode for a non-aqueous rechargeable battery according to the embodiment of the invention, a negative electrode, and a non-aqueous electrolyte.

Furthermore, the non-aqueous rechargeable battery according to the embodiment of the invention is a non-aqueous rechargeable battery that includes a positive electrode, a negative electrode, a separator, and an electrolyte and includes a positive electrode and a negative electrode. The positive electrode includes a positive electrode active material that includes a lithium nickel composite oxide represented by the following general compositional formula (1) and a coating layer formed on a surface of the positive electrode active material and made of an organic silane compound. The negative electrode includes a negative electrode active material made of a complex of $SiO_y$ (0.5≤y≤1.5) and a carbon material and graphite. The content of the complex in the negative electrode active material is from 3% by mass to 20% by mass.

$$Li_{1+x}MO_2 \quad (1)$$

where −0.5≤x≤0.5, and M represents a group of at least two elements including at least one of Mn and Co and Ni and 20≤a<100 and 50≤a+b+c≤100 when the ratios (mol %) of Ni, Mn and Co in the elements forming M are a, b, and c, respectively.

Furthermore, a method of manufacturing a positive electrode material according to the embodiment of the present invention is a method of manufacturing a positive electrode material for use in a positive electrode for a non-aqueous rechargeable battery and includes the step of adjusting a remaining amount of an alkaline component in the lithium nickel composite oxide represented by the general compositional formula (1) so that when the supernatant of a mixture obtained by mixing and stirring 20 g of the oxide and 100 ml of pure water in a nitrogen atmosphere for 1 hour is titrated with 0.2 mol/l hydrochloric acid, a resulting titer is from 0.5 ml to 150 ml and the step of forming a coating layer made of an organic compound on a surface of the lithium nickel composite oxide in which the remaining amount of the alkaline component is adjusted.

According to the embodiment of the present invention, a positive electrode material with reduced changes over time during manufacturing a positive electrode and high productivity and a manufacturing method thereof can be provided. Furthermore, according to the embodiment of the present invention, a non-aqueous rechargeable battery less likely to swell during storage at high temperatures and a positive electrode for a non-aqueous rechargeable battery that can form the non-aqueous rechargeable battery can be provided. According to the embodiment of the present invention, a positive electrode material from which metal ions are unlikely to be eluted, a method of manufacturing the positive electrode material, and a positive electrode for a non-aqueous rechargeable battery using the positive electrode material can be provided. According to the embodiment of the present invention, a non-aqueous rechargeable battery that is less likely to swell and can restrain a reduction in the capacity during storage at high temperatures can be provided.

MODE FOR CARRYING OUT THE INVENTION

Figure 1:
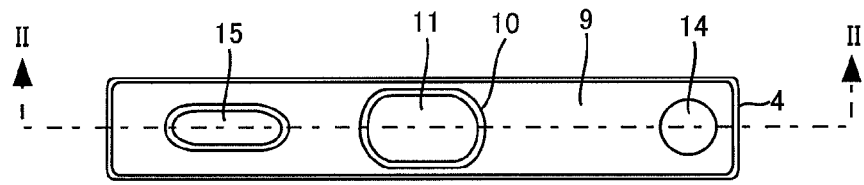
FIG. 1 is a plan view of an example of a non-aqueous rechargeable battery according to an embodiment of the present invention.

Embodiments of the present invention will be described in detail by referring to the accompanying drawings. Note that the same or corresponding portions are designated by the same reference characters and their description will not be repeated.

A positive electrode for a non-aqueous rechargeable battery (hereinafter also simply referred to as "positive electrode") according to an embodiment of the present invention has a positive electrode mixture layer formed by the steps of applying a positive electrode mixture containing composition including for example a positive electrode material, a binder, and a conduction aid added if necessary on one or both surfaces of a collector and drying it. More specifically, the positive electrode according to the present invention has a positive electrode mixture layer including a positive electrode material, a binder, and the like on one or both surfaces of a collector.

A non-aqueous rechargeable battery formed using the positive electrode according to the embodiment of the present invention is less likely to swell during storage at high temperatures and therefore has high productivity.

First Embodiment

A positive electrode material according to a first embodiment of the present invention includes at least a lithium nickel composite oxide represented by the following general compositional formula (1) as a positive electrode active material.

$$Li_{1+x}MO_2 \quad (1)$$

where −0.5≤x≤0.5 and M represents a group of at least two elements including at least one of Mn and Co and Ni, wherein 20≤a<100 and 50≤a+b+c≤100 for a, b and c being the ratios (mol %) of Ni, Mn, and Co, respectively among the elements that constitute M.

The lithium nickel composite oxide represented by the general compositional formula (1) includes an element group M including at least one selected from Mn and Co and Ni. Among the elements, Ni is a component that contributes to improvement in the capacity of the lithium nickel composite oxide.

It is preferable that Ni has a large ratio in the general compositional formula (1) that represents the lithium nickel composite oxide in order to achieve high capacity. Therefore, in the general compositional formula (1) that represents the lithium nickel composite oxide, when the total element number of the element group M is 100 mol %, the ratio a of Ni is not less than 20 mol %, preferably not less than 50 mol % in order to allow for improvement in the capacity of the lithium nickel composite oxide. However, if the Ni ratio is too large in the lithium nickel composite oxide, Ni could be introduced into the Li site, which tends to result in a nonstoichiometric composition. Therefore, the ratio a of Ni is preferably not more than 97 mol %, more preferably not more than 90 mol %.

In the lithium nickel composite oxide, the presence of Mn in its crystal lattice stabilizes the layered structure together with Ni that is bivalent, so that the lithium containing composite oxide may have improved thermal stability and therefore a non-aqueous rechargeable battery with higher safety can be formed.

In order to secure the effect brought about by the inclusion of Mn better, the ratio b of Mn is preferably not less than 1 mol % when the total element number of the element group M is 100 mol % in the general compositional formula (1) that represents the lithium nickel composite oxide. However, when the Mn content is too large in the lithium nickel composite oxide, more Mn elutes as the battery is charged/discharged, which tends to degrade the charge/discharge cycle characteristic and the like, and therefore the ratio b of Mn is preferably not more than 70 mol %.

In the lithium nickel composite oxide, the presence of Co in its crystal lattice can relax an irreversible reaction caused by a phase transition of the lithium containing composite oxide attributable to doping and de-doping of Li caused by charge/discharge of an electrochemical device, so that the reversibility of the crystal structure of the lithium containing composite oxide can be increased, which allows a non-aqueous rechargeable battery with prolonged charge/discharge cycle life to be obtained.

In order to secure the above described effect better by the inclusion of Co, the ratio c of the Co is preferably not less than 1 mol % when the total element number of the element group M is 100 mol % in the general compositional formula (1) that represents the lithium nickel composite oxide. However, if the Co content is too large in the lithium nickel composite oxide, Co elutes and the charge/discharge cycle characteristic and thermal stability tend to be lowered, and therefore the ratio c of Co is preferably not more than 50 mol %.

Note that in the general compositional formula (1) that represents the lithium nickel composite oxide, the total (a+b+c) of the ratio a of Ni, the ratio b of Mn, and the ratio c of Co is not less than 50 mol %, preferably not less than 60 mol % in view of securing a better capacity when the total element number of the element group M is 100 mol %. In order to improve the charge/discharge cycle characteristic and thermal stability, at least one element other than Ni, Mn, and Co that is selected for example from Al, Mg, Ti, Fe, Cr, Cu, Zn, Ge, Sn, Ca, Sr, Ba, Ag, Ta, Nb, Mo, B, P, Zr, W, and Ga is preferably included in the lithium nickel composite oxide represented by the general compositional formula (1), and therefore the total (a+b+c) of the ratio a of Ni, the ratio b of Mn, and the ratio c of Co is preferably not more than 97 mol %.

In the lithium nickel composite oxide, the presence of Al in the crystal lattice can stabilize the crystal structure of the lithium nickel composite oxide and improve its thermal stability, which allows a non-aqueous rechargeable battery with higher safety to be formed. The presence of Al on grain boundaries or a surface of the lithium nickel composite oxide grains can improve its stability over time and recue a sub reaction with an electrolytic solution, so that a non-aqueous rechargeable battery with an even longer useful life can be formed.

Note however that Al cannot contribute to the charge/discharge capacity, and therefore too much Al contained in the lithium nickel composite oxide may lower the capacity. Therefore, when the total element number of the element group M is 100 mol % in the general compositional formula (1) that represents the lithium nickel composite oxide, the ratio d of Al is not more than 10 mol %. Note that in order to secure the effect obtained by the inclusion of Al better, the Al ratio d is preferably not less than 0.02 mol %.

In the lithium nickel composite oxide, the presence of Mg in the crystal lattice can stabilize the crystal structure of the lithium nickel composite oxide and may improve its thermal stability, so that a safer non-aqueous rechargeable battery can be obtained. An irreversible reaction caused by a phase transition of the lithium containing composite oxide attributable to doping and de-doping of Li caused by charge/discharge of an electrochemical device can be eased as Mg is transferred to the Li site, so that the reversibility of the crystal structure of the lithium nickel composite oxide can be increased, which allows a non-aqueous rechargeable battery with prolonged charge/discharge cycle life to be obtained. In particular, when x<0 and the lithium nickel composite oxide has a Li deficient crystal structure in the general compositional formula (1) that represents the lithium nickel composite oxide, Mg is introduced in the Li site instead of Li to form the lithium nickel composite oxide, and therefore a stable compound can be obtained.

Note however that since the contribution of Mg to the charge/discharge capacity is small, too much Mg contained in the lithium nickel composite oxide tends to cause a reduction in the capacity. Therefore, when the total element number of the element group M is 100 mol % in the general compositional formula (1) that represents the lithium nickel composite oxide, the ratio e of Mg is preferably not more than 10%. Note that in order to secure the effect by the inclusion of Mg better, the ratio e of Mg is preferably not less than 0.02 mol % in the general compositional formula (1) that represents the lithium nickel composite oxide.

When Ti is included in the particles of the lithium nickel composite oxide, Ti is placed in crystal defects such as oxygen deficiency in a $LiNiO_2$ crystal structure, which stabilizes the crystal structure. As a result, the reaction reversibility of the lithium nickel composite oxide is improved, so that a non-aqueous rechargeable battery with a good charge/discharge characteristic can be formed. The use of a composite compound including homogeneously mixed Ni and Ti as materials to synthesize the lithium nickel composite oxide can increase the capacity of a non-aqueous rechargeable battery.

In order to secure the effect by Ti better, when total element number of the element group M is 100 mol % in the general compositional formula (1) that represents the lithium nickel composite oxide, the ratio f of Ti is preferably not less than 0.01 mol %, more preferably not less than 0.1 mol %. In the general compositional formula (1) that represents the lithium nickel composite oxide, the ratio f of Ti must be not more than 50 mol %, preferably not more than 10 mol %, more preferably not more than 5 mol %, even more preferably not more than 2 mol %.

An alkaline earth metal such as Ca, Sr, and Ba included in the particles of the lithium nickel composite oxide promotes growth of primary particles, which improves the crystallinity of the lithium containing composite oxide. Therefore, a sub reaction with an electrolytic solution is suppressed and swelling is less likely during storage at high temperatures. As an alkaline earth metal, Ba is particularly preferable. The ratio of the alkaline earth metal selected from Ca, Sr, and Ba is not more than 10 mol %, preferably not more than 5 mol %, even more preferably not more than 3 mol %.

The inclusion of Fe in the lithium nickel composite oxide can stabilize the crystal structure and improve the thermal stability. The use of a composite compound including a homogeneous mixture of Ni and Fe as materials to be synthesized to form the lithium nickel composite oxide can increase the capacity.

In order to secure the effect of Fe described above better, the ratio g of Fe is preferably not less than 0.01 mol % when the total element number of the element group M is 100 mol % in the general compositional formula (1) that represents the lithium nickel composite oxide. However, too much Fe is more likely to produce bivalent Fe, and the capacity and discharge potential are lowered, which could degrade the energy density of an electrochemical device. Therefore, in the general compositional formula (1) that represents the lithium nickel composite oxide, the ratio g of the Fe should be not more than 50 mol %, preferably not more than 40 mol %, more preferably not more than 20 mol %.

The lithium nickel composite oxide may include one or more or all of elements such as Mn, Co, Al, Mg, Ti, Ba and Fe.

The lithium nickel composite oxide can be synthesized by the steps of mixing a Li containing compound and a Ni containing compound and any of a Mn containing compound, a Co containing compound, an Al containing compound, a Mg containing compound, a Ti containing compound, a Ba containing compound, and a Fe containing compound if necessary and baking them. Note that in order to synthesize the lithium nickel composite oxide to have a higher purity, at least one element selected from for example Mn, Co, Al, Mg, Ti, Fe, Cr, Cu, Zn, Ge, Sn, Ca, Sr, Ba, Ag, Ta, Nb, Mo, B, P, Zr, W, and Ga and a Ni containing composite compound (a coprecipitate including any of these elements, a hydrothermally synthesized compound, a mechanically synthesized compound and a compound obtained by thermally treating them) are preferably used. A hydroxide or an oxide including any of the above described elements is preferably used as the composite compound.

In synthesizing the lithium nickel composite oxide, a mixture of raw material compounds may be baked for example at temperatures from 600° C. to 1000° C. for 1 to 24 hours.

In baking the raw material mixture, the mixture is preferably heated to a temperature lower than a baking temperature (for example from 250° C. to 850° C.) first and then kept at the temperature for about 0.5 to 30 hours for preheating, followed by heating to the baking temperature to let a reaction progress rather than being heated to the prescribed temperature at a time and the oxygen concentration in the baking environment is preferably kept constant. In this way, the composition of the lithium nickel composite oxide can be more homogeneous.

The atmosphere during baking the raw material mixture may be an atmosphere including oxygen (i.e., the air), a mixture atmosphere including an inactive gas (such as argon, helium, and nitrogen) and an oxygen gas, or an oxygen gas atmosphere, and the oxygen concentration (on a volume basis) is preferably not less than 15%, more preferably not less than 18%. Note however that in view of reducing the manufacturing cost of the lithium nickel composite oxide and increasing its productivity and hence the productivity of the positive electrode, the raw material mixture is more preferably baked in the air flow.

The flow rate of the gas during baking the raw material mixture is preferably not less than 2 $dm^3$ per 100 g of the mixture. If the gas flow rate is too low or if the gas flow speed is too low, the composition homogeneity of the lithium nickel composite oxide could be degraded. Note that the flow rate of the gas during baking the raw material mixture is preferably not more than 5 $dm^3$/min per 100 g of the mixture.

In the step of baking the raw material mixture, a mixture produced by dry mixing may be used directly, but it may be dispersed in a solvent such as ethanol, made into slurry, mixed for about 30 to 60 minutes using for example a planetary ball mill and dried for use. The lithium nickel composite oxide synthesized by this method can have even higher homogeneity in this way.

The lithium nickel composite oxide synthesized by the above-described method usually includes an alkaline component as an impurity. As will be described, when a surface of the lithium nickel composite oxide is coated with an organic compound (such as an organic silane compound), the alkaline component would serve as a catalyst that promotes hydrolysis and condensation reaction of the organic compound (such as an organic silane compound). Therefore, a certain amount of a remaining alkaline component does not preclude the effect of the organic compound (such as organic silage compound) from taking place while the alkaline component in a prescribed amount or more could cause the coating of the organic compound (such as an organic silage compound) to be localized in locations with impurities and reduce the effect of the organic compound (such as organic silane compound).

Therefore, instead of using the synthesized lithium nickel composite oxide directly, the oxide is more preferably removed of the alkaline component before it is used to manufacture a positive electrode material so that the remaining amount of the alkaline component as an impurity is not more than a prescribed amount. The amount of the alkaline component included in the positive electrode active material is preferably adjusted so that when the supernatant of a mixture obtained by mixing and stirring 20 g of an active material and 100 ml of pure water in a nitrogen atmosphere for 1 hour is titrated with 0.2 mol/l hydrochloric acid, the titer is from 0.5 ml to 150 ml. The titration condition corresponds to the lithium nickel composite oxide including an alkaline component whose content is 0.01% to 2% relative to the entire lithium nickel composite oxide. Therefore, the lithium nickel composite oxide according to the first embodiment includes an alkaline component whose content is from 0.01% to 2%. The remaining amount of the alkaline component can be adjusted by washing the lithium nickel composite oxide for example with water.

Note that in order to adjust the titer to 0.5 ml or less, excessive washing may be necessary, which could degrade the characteristics of the lithium nickel composite oxide, and therefore the titer is preferably in a range not less than 0.5. The effect of coating the positive electrode active material with an organic silane compound may be improved more by the above-described steps.

Water or an organic solvent is used for washing the lithium nickel composite oxide. Examples of the organic solvent includes alcohols such as methanol, ethanol, isopropanol, and ethylene glycol, ketones such as acetone and methyl ethyl ketone, ethers such as diethyl ether, ethylpropyl ether, diisopropyl ether, dimethoxyethane, diethoxyethane, trimethoxymethane, tetrahydrofuran, 2-methyltetrahydrofuran, a tetrahydrofuran derivative, γ-butyrolactone, dioxolane, a dioxolane derivative, and 3-methyl-2-oxazolidinone, esters such as methyl formate, ethyl formate, methyl acetate, ethyl acetate, and phosphotriester, N-methyl-2-pyridone (NMP), ethylene carbonate (EC), propylene carbonate (PC), butylene carbonate (BC), dimethyl carbonate (DMC), diethyl carbonate (DEC), methyl ethyl carbonate (MEC), a propylene carbonate derivative, dimethyl sulfoxide, formamide, a sulfur containing organic solvent, and a fluorine containing organic solvent. These organic solvents or water may be used independently or two or more of them may be used together.

Note that prior to washing with water or an organic solvent, the lithium nickel composite oxide is preferably ground.

The lithium nickel composite oxide after being washed with water or an organic solvent is preferably thermally treated. The thermal treatment allows transition metals in the lithium nickel composite oxide to be rearranged and dispersion of Li in the lithium nickel composite oxide to proceed, so that the valences of the transition metals in the entire lithium nickel composite oxide and on the surface can be stabilized.

In order to promote dispersion of LI included in the Li containing compound (such as lithium carbonate) that has not been removed completely by washing, the temperature for the thermal treatment is preferably not less than 600° C. at which the Li containing compound melts and not more than 1000° C. so that the lithium nickel composite oxide can be prevented from decomposing. The time for the thermal treatment is preferably from 1 to 24 hours. The atmosphere for the thermal treatment is preferably an atmosphere with an oxygen concentration of 18 vol % or more (the treatment may be carried out in an atmosphere with an oxygen concentration of 100 vol %).

A positive electrode according to the first embodiment of the present invention uses lithium nickel composite oxide as a positive electrode active material, but it may use a different active material. Examples of active materials other than the lithium nickel composite oxide include a lithium cobalt oxide such as $LiCoO_2$, a lithium manganese oxide such as $LiMnO_2$ and $Li_2MnO_3$, a lithium nickel oxide such as $LiNiO_2$, a lithium containing composite oxide in a layered structure such as $LiCo_{1-x}Ni_xO_2$ (where x<0.2), a lithium containing composite oxide in a spinel structure such as $LiMn_2O_4$ and $Li_{4/3}Ti_{5/3}O_4$, a lithium containing composite oxide in an olivine structure such as $LiFePO_4$, and an oxide obtained by substituting part of the oxide as a basic composition material with any of various elements. Note that when a different active material is used, the ratio of this active material is preferably not more than 40% of the entire active material in a mass ratio, more preferably not more than 30% in order to clarify the effect of the invention.

In the positive electrode according to the first embodiment of the present invention, a positive electrode mixture layer is formed by the step of forming a composition (a positive electrode mixture containing composition) that includes a positive electrode active material including the lithium nickel composite oxide, an organic silane compound, and a binder, applying the composition on one or both surfaces of a collector, and drying it. In the composition described above, a surface of the positive electrode active material would be coated with the organic silane compound, which can significantly reduce moisture in the air or composition to adsorb to the positive electrode active material. As a result, an alkaline component can be restrained from newly forming based on a reaction between the positive electrode active material and the moisture, so that swelling of a non-aqueous rechargeable battery during storage at high temperatures attributable to the alkaline component and the capacity drop can be reduced.

The positive electrode material according to the present invention includes a positive electrode active material having a coating layer of an organic compound formed on a surface of the positive electrode active material (the method of forming the coating layer of the organic compound will be described later), the organic compound (such as an organic silane compound) would be dispersed in the positive electrode mixture containing composition in addition to coating the positive electrode active material, and the organic compound (such as an organic silane compound) moves to the interface between the positive electrode mixture containing composition and the air and serves like a coating, so that moisture in the air may not easily come into the positive electrode mixture containing composition. Therefore, the amount of moisture adhered to the positive electrode active material in the positive electrode mixture containing composition is reduced. Also when fluorine based resin such as PVDF is used for the binder, de-fluorination in which fluorine as a constituent element desorbs in the form of hydrofluoric acid could be reduced and gelation of the positive electrode mixture containing composition could be reduced. This improves the stability of the positive electrode mixture containing composition and the long term storage characteristic improves, so that the rejection rate is reduced, and therefore the productivity of a positive electrode and hence the productivity of a non-aqueous rechargeable battery using the same can be improved.

Examples of the organic compound that forms the coating layer include an organic silane compound, an organic titanium compound, an organic palladium compound, an organic magnesium compound, an organic lithium compound, an organic aluminum compound, an organic tin compound, an organic platinum compound, an organic boron compound, an organic phosphorus compound, and an organic sulfur compound, among which an organic silane compound is preferably used because it reacts with a surface of the positive electrode active material and adsorbs to the surface.

An example of the organic silane compound includes a compound represented by a general formula $X^1-Si(OR^1)_3$ or $X^2-SiR^2(OR^3)_2$. In the general formulas, $R^1$, $R^2$, and $R^3$ are $-CH_3$, $-C_2H_5$ or $-C_3H_7$ and $R^2$ and $R^3$ may be the same or different. In the general formulas, $X^1$ and $X^2$ are each any of various functional groups and $-Si(OR^1)_3$ or $-SiR^2(OR^3)_2$.

More specifically, examples of such compounds include an organic silane compound having a vinyl group such as vinyl trichlorosilane, vinyl trimethoxysilane, and vinyl triethoxysilane; an organic silane compound having an epoxy group such as 2-(3,4-epoxycyclohexyl)ethyltrimethoxysilane, 3-glycidoxypropyltrimethoxysilane, and 3-glycidoxypropyltriethoxysilane; an organic silane compound having a styryl group such as p-styryltrimethoxysilane; an organic silane compound having a methacryloxy group such as 3-methacryloxypropylmethyldimethoxysilane, 3-methacryloxypropyltrimethoxysilane, 3-methacryloxypropylmethyldimethoxysilane, and 3-methacryloxypropyltriethoxysilane; an organic silane compound having an acryloxy group such as 3-acryloxypropyltrimethoxysilane; an organic silane compound having an amino group such as N-2-(aminoethyl)-3-aminopropylmethyldimethoxysilane, N-2-(aminoethyl)-3-aminopropyltrimethoxysilane, 3-aminopropyltriethoxysilane, 3-aminopropyltrimethoxysilane, 3-aminopropyltriethoxysilane, 3-triethoxysilyl N-(1,3-dimethyl-butylidene)propylamine, N-phenyl-3-aminopropyltrimethoxysilane, and a hydrochloride of N-(vinylbenzyl)-2-aminoethyl-3-aminopropyltrimethoxysilane; an organic silane compound having a ureido group such as 3-ureidopropyltriethoxysilane; an organic silane compound having a chloropropyl group such as 3-chloropropylmethoxysilane, an organic silane compound having a mercapto group such as 3-mercaptopropylmethyldimethoxysilane, and 3-mercaptopropyltrimethoxysilane; an organic silane compound having a sulfide group such as bis(triethoxysilylpropyl)tetrasulfide; and an organic silane compound having an isocyanate group such as 3-isocyanatepropyltriethoxysilane.

Any of the organic silane compounds listed above may be used independently or two or more of them may be used together. Among the organic silane compounds listed above, those having a boiling point of 200° C. or higher are more preferably used. Organic silane compounds having a boiling point of 200° C. or lower tends to be volatile in the electrode mixture containing composition, which sometimes degrades the effects brought about by the use of the organic silane compound.

As for the binder for the positive electrode according to the first embodiment of the invention, either thermoplastic resin or thermosetting resin may be used as long as it is chemically stable in a non-aqueous rechargeable battery. Examples of the binder include polyethylene, polypropylene, polytetrafluoroethylene (PTFE), PVDF, polyhexafluoropropylene (PHFP), styrene-butadiene rubber, a tetrafluoroethylene-hexafluoroethylene copolymer, tetrafluoroethylene-hexafluoropropylene copolymer (FEP), tetrafluoroethylene-perfluoroalkylvinylether copolymer (PFA), a vinylidene fluoride-hexafluoropropylene copolymer, a vinylidene fluoride-chlorotrifluoroethylene copolymer, an ethylene-tetrafluoroethylene copolymer (ETFE resin), polychlorotrifluoroethylene (PCTFE), a vinylidene fluoride-pentafluoropropylene copolymer, a propylene-tetrafluoroethylene copolymer, an ethylene-chlorofluoroethylene copolymer (ECTFE), a vinylidene fluoride-hexyafluoropropylene-tetrafluoroethylene copolymer, a vinylidene fluoride-perfluoromethylvinylether-tetrafluoroethylene copolymer, or an ethylene-acrylic acid copolymer, an ethylene-methacrylic acid copolymer, an ethylene-methyl acrylate copolymer, an ethylene-methyl methacrylate copolymer, and a Na ion crosslinked product of the copolymers. One of them may be used independently or two or more may be used. Among them, fluororesin such as PVDF, PTFE, and PHFP is preferable in view of their stability in a non-aqueous rechargeable battery and the characteristics of a non-aqueous rechargeable battery and two or more of them may be used at a time or a copolymer formed by monomers of them may be used.

The amount of the binder in the positive electrode mixture layer for a positive electrode is preferably as small as possible if the positive electrode active material and a conduction aid are stably bound, and is preferably 0.03 to 2 parts by mass relative to 100 parts by mass of the positive electrode active material.

The conduction aid added if necessary needs only be chemically stable in a non-aqueous rechargeable battery. Examples of the conduction aid include graphite such as natural graphite and artificial graphite; carbon black such as acetylene black, Ketjen black (trade name), channel black, furnace black, lamp black, and thermal black; conductive fiber such as carbon fiber and metal fiber; metal powder such as aluminum powder; fluorocarbon; zinc oxide; a conductive wisker made for example of potassium titanate; a conductive metal oxide such as titanium oxide; an organic conductive material such as a polyphenylene derivative. One of the above may be used independently or two or more may be used at a time. Among them, highly conductive graphite and carbon black with high liquid absorption are preferably used. The form of the conduction aid is not limited to primary particles and a secondary aggregate form or a chain structure can be used. Such an aggregate is easier to handle and has high productivity.

The amount of the conduction aid in the positive electrode mixture layer needs only have good conductivity and liquid absorption and is preferably from 0.1 to 2 parts by mass relative to 100 parts by mass of the positive electrode active material 100.

When a positive electrode according to the first embodiment of the present invention is manufactured, a positive electrode active material and an organic compound (such as an organic silane compound) are blended into a mixture. Note that in order to form a mixture of an active material for an electrode and an organic compound (such as an organic silane compound), the positive electrode active material and the organic compound (such as an organic silane compound) may be mechanically blended by stirring, a solution obtained by dissolving an organic compound (such as an organic silane compound) in a solvent or the like may be sprayed over a positive electrode active material, followed by drying to remove the solvent. Examples of the solvent used to dissolve an organic compound (such as an organic silane compound) include water; and organic solvents such as ketones (such as acetone, methyl ethyl ketone, and methyl isobutyl ketone) and alcohols (ethanol and isopropanol), toluene, and N-methyl-2-pyrolidone. Note that when the mixture of the positive electrode active material and the organic compound (such as an organic silane compound) is thermally treated at 80° C. or higher, a reaction with the organic compound (such as an organic silane compound) is believed to proceed, so that improved effects can be expected.

Prior to forming such a mixture of a positive electrode active material and an organic compound (such as an organic silane compound), the positive electrode active material is preferably dry-ground. A produced positive electrode active material often has a plurality of particles agglomerated, and previous dry grinding of them makes it easier for the organic compound (such as an organic silane compound) to coat a surface of the positive electrode active material. The positive electrode active material may be dry-ground for example by grinding with a mortar or a grinder, while the method is not limited to the above and any method that can break up the agglomeration of the positive electrode active material by mechanical dispersion and grinding may be employed.

In the mixture of a positive electrode active material and an organic compound (such as an organic silane compound), the amount of the organic silane compound relative to 100 parts by mass of the positive electrode active material is preferably not less than 0.01 parts by mass, more preferably not less than 0.1 parts by mass in view of securing the effect obtained by the use of the an organic compound (such as an organic silane compound) better. Note however that in the mixture, an excessive amount of the organic compound (such as an organic silane compound) reduces the positive electrode active material in the positive electrode mixture layer, and an excessive amount of the organic compound (such as an organic silane compound) sticking to the surface of the positive electrode active material precludes charge/discharge reactions, which could lower the capacity of a battery. Therefore, in the mixture of the positive electrode active material and the organic compound (such as an organic silane compound), the amount of the an organic compound (such as an organic silane compound) relative to 100 parts by mass of the positive electrode active material is preferably not more than 20 parts by mass, more preferably not more than 3 parts by mass.

In the mixture of a positive electrode active material and an organic compound (such as an organic silane compound), when the amount of the organic compound (such as an organic silane compound) relative to 100 parts by mass of the positive electrode active material is A (parts by mass), and the specific surface area of the positive electrode active material is B ($m^2/g$), A/B is preferably not less than 0.01, more preferably not less than 0.1 and preferably not more than 50, more preferably not more than 10. If for example, A/B is too small, the surface of the positive electrode active material cannot sufficiently be covered with the organic compound (such as an organic silane compound), the above-described effect brought about by using the organic compound (such as an organic silane compound) could be reduced, while if the A/B is too large, an excessive amount of the organic compound (such as an organic silane compound) could stick to the surface of the positive electrode active material, which may preclude charge/discharge reactions.

Note that the specific surface area B of the positive electrode active material is preferably 0.1 $m^2/g$ to 100 $m^2/g$. The specific surface area of the positive electrode active material herein is a BET specific surface area available using a specific surface area measuring device ("Macsorb HM model-1201" manufactured by Mountech Co., Ltd.) based on a nitrogen adsorption method.

The mixture of the positive electrode active material and the organic compound (such as an organic silane compound) obtained as described above, the binder, and the conduction aid are dispersed in a solvent (for example an organic solvent such as NMP) and prepared into a positive electrode mixture containing composition in a paste or slurry state. (Note that the binder may be dissolved in the solvent). A positive electrode according to the first embodiment of the present invention is manufactured by the steps of applying the positive electrode mixture containing composition on one or both surfaces of a collector, drying it, and pressing it if necessary in order to adjust the thickness and density of the positive electrode mixture layer.

Note that instead of previously forming the mixture of a positive electrode active material and an organic compound (such as an organic silane compound) in advance, the positive electrode active material, the organic compound (such as an organic silane compound), the binder, and the conduction aid may be dispersed in a solvent and prepared into a positive electrode mixture in a paste or slurry state. In this case, the organic silane compound coats the surface of the positive electrode active material in the process of its dispersion in the solvent, so that the same effect as the above can be expected.

The drying after applying the positive electrode mixture containing composition on the surface of the collector may be carried out at room temperatures (25° C.), while the drying is preferably carried out during heating. Drying and heating at the same time allow a positive electrode mixture layer to be formed more quickly and a reaction of the organic compound (such as an organic silane compound) in the positive electrode mixture layer would be more progressed, so that further reduction in the swelling of a battery during storage at high temperatures by the organic compound (such as an organic silane compound) can be expected. Note that in view of letting the reaction of the an organic compound (such as an organic silane compound) progress even better, it is particularly preferable that the amount of an alkaline component included in the positive electrode active material is adjusted or the temperature for drying after the application of the electrode mixture containing composition on the surface of the collector is not less than 120° C.

The material of the collector for the positive electrode is not specifically limited as long as it is an electronic conductor that is chemically stable in a non-aqueous rechargeable battery. Examples of such a material include aluminum or an aluminum alloy, stainless steel, nickel, titanium, carbon, and conductive resin as well as a composite material having a carbon or titanium layer formed on a surface of aluminum, an aluminum alloy, or stainless steel. Among the above, aluminum or an aluminum alloy which is lightweight and has high conductivity is preferably used. For the collector of the positive electrode, for example a foil, a film, a sheet, a net, a punching sheet, a lath member, a porous member, a foam, or a compact of a fiber group made from any of the above described materials may be used. The surface of the collector may be subjected to surface treatment to have irregularities. The thickness of the collector is not specifically limited but is normally from 1 μm to 500 μm.

A positive electrode mixture containing composition may be applied on a surface of such a collector for example by a material pulling-up method using a doctor blade; a coater method using a die coater, a comma coater, and a knife coater; and a printing method such as screen printing and relief printing.

The positive electrode mixture layer formed as described above preferably has a thickness from 15 μm to 200 μm for each surface of the collector. The positive electrode mixture layer has preferably a density not less than 3.2 g/cm$^3$, more preferably not less than 3.4 g/cm$^3$. Using the positive electrode having such a high density mixture layer, high capacity can be obtained. Note however that if the density of the positive electrode mixture layer is too high, the porosity is reduced, which could lower the permeability of a non-aqueous electrolyte, and therefore the density of the positive electrode mixture layer is preferably not more than 3.8 g/cm$^3$. Note that the thus formed positive electrode mixture layer may be formed to have the above-described density by press treatment that carries out roll-press with a linear pressure of about 1 kN/cm to 10 kN/cm.

Note that the density of the positive electrode mixture layer herein is a value measured by the following method. A part of a positive electrode with a prescribed area is cut, its mass is measured using an electronic force balance whose minimum scale is 0.1 mg, and the mass of the positive electrode mixture layer is produced by subtracting the mass of a collector. Meanwhile, the total thickness of the positive electrode is measured at 10 points using a micrometer whose minimum scale is 1 μm, and the volume of the positive electrode mixture layer is produced based on the average of the values obtained by subtracting the thickness of the collector from these measured values and the area. The mass of the positive electrode mixture layer is divided by the volume to produce the density of the positive electrode mixture layer.

The positive electrode according to the first embodiment of the present invention may be provided with a lead member used to electrically connect with another member in the non-aqueous rechargeable battery if necessary according to a conventional method.

A non-aqueous rechargeable battery to which a positive electrode according to the first embodiment of the present invention can be applied is not limited to anything with a particular form as long as a non-aqueous electrolyte can be used therefor. More specifically, a non-aqueous rechargeable battery according to the first embodiment of the present invention has a positive electrode according to the first embodiment of the present invention and the other arrangement and structure are not particularly limited, and any of conventionally known arrangements and structures employed for non-aqueous rechargeable batteries can be applied.

A negative electrode may have, on one or both surfaces of a collector, a negative electrode mixture layer made of a negative electrode mixture including a negative electrode active material and a binder as well as a conduction aid if necessary.

Examples of the negative electrode active material include graphite, pyrolytic carbons, cokes, glassy carbons, baked substances of organic polymer compounds, mesocarbon microbeads, carbon fiber, activated carbon, a metal (such as Si and Sn) capable of forming an alloy with lithium or an alloy thereof. Those listed above as examples that can be used for the electrode according to the first embodiment of the present invention can also be used for a binder and a conduction aid.

The material of a collector for a negative electrode is not particularly specified as long as it is a chemically stable conductor in a resulting battery. Examples of the material include copper or a copper alloy, stainless steel, nickel, titanium, carbon, conductive resin as well as a composite material having a carbon or titanium layer formed on a surface of copper, a copper alloy or stainless steel. Among them, copper or a copper alloy is particularly preferable because they do not form an alloy with lithium and has high electronic conductivity. Examples of the collector for a negative electrode include a foil, a film, a foil, a film, a sheet, a net, a punching sheet, a lath member, a porous member, a foam, or a compact of a fiber group made from any of the above described materials. The surface of the collector may be subjected to surface treatment to have irregularities. The thickness of the collector is normally from 1 μm to 500 μm though not particularly limited.

A negative electrode may be obtained by applying, on one or both surfaces of a collector, a negative electrode mixture containing composition in a paste or slurry state obtained by dispersing a negative electrode mixture that includes a negative electrode active material and a binder as well as a conduction aid if necessary in a solvent (the binder may be dissolved in the solvent), followed by drying to form a negative electrode mixture layer. Note that the negative electrode may be produced by any of other methods than the above-described manufacturing method. The negative electrode mixture layer preferably has a thickness from 10 μm to 300 μm for each surface of the collector.

A separator is preferably a porous film made of polyolefins such as polyethylene, polypropylene, and an ethylene-propylene copolymer; and polyesters such as polyethylene terephthalate and copolyester. Note that the separator preferably has a property to have its pores blocked (i.e., with a shutdown function) at 100° C. to 140° C. Therefore, the separator more preferably has, as a component, thermoplastic resin with a melting temperature of 100° C. to 140° C. measured by a differential scanning calorimetry (DSC) according to JIS K 7121 requirement. It is preferable that the separator is a single layer porous film having polyethylene as a main constituent or a laminated porous film having a porous film as a component such as a laminated porous film including two to five layers of polyethylene and polypropylene laminated on one another. When polyethylene and resin having a higher melting point than polyethylene such as polypropylene are mixed or laminated for use, the amount of polyethylene as resin to form the porous film is preferably not less than 30% by mass, more preferably not less than 50% by mass.

The resin porous film may be a porous film for example made of the thermoplastic resin listed above that is used in conventional non-aqueous rechargeable batteries, in other words, an ion permeable porous film manufactured for example by a solvent extraction method or a dry or wet drawing method.

The average pore size of the separator is preferably not less than 0.01 μm, more preferably not less than 0.05 μm, preferably not more than 1 μm, more preferably not more than 0.5 μm.

As for the characteristic of the separator, its Gurley value that represents in second the time required for 100 ml of air to pass the film at a pressure of 0.879 g/mm$^2$ and is obtained according to JIS P 8117 is preferably 10 sec to 500 sec. If the air resistance is too high, the ion permeability is reduced, while if the air resistance is too low, the strength of the separator may be lowered. Furthermore, as for the strength, the piercing strength of the separator using a needle with a diameter of 1 mm is desirably not less than 50 g. If the piercing strength is too low, the separator is pierced and broken and a short circuit may be caused when dendrite crystal of lithium is generated.

The non-aqueous electrolyte may be a solution having an electrolytic salt dissolved in an organic solvent (a non-aqueous electrolytic solution). The solvent may be an aprotic organic solvent, examples of which include ethylene carbonate (EC), propylene carbonate (PC), butylene carbonate (BC), dimethyl carbonate (DMC), diethyl carbonate (DEC), methylethyl carbonate (MEC), γ-butyrolactone, 1,2-dimethoxyethane, tetrahydrofuran, 2-methyltetrahydrofuran, dimethylsulfoxide, 1,3-dioxolane, formamide, dimethylformamide, dixolane, acetonitrile, nitromethane, methyl formate, methyl acetate, phosphotriester, trimethoxymethane, a dioxolane derivative, sulfolane, 3-methyl-2-oxazolidinone, a propylenecarbonate derivative, a tetrahydrofuran derivative, diethylether, and 1,3-propane sultone. One of the above may be used independently or two or more of them may be used together. An aminimide-based organic solvent or a sulfur- or fluorine-containing organic solvent may be used. Among them, a mixture solvent of EC, MEC, and DEC is preferably applied, and in this case, 15% by volume to 80% by volume of DEC is more preferably included relative to the entire volume of the mixture solvent. This is because using the mixture solvent, while the low temperature characteristic and charge/discharge characteristic of a battery can be kept in a high level, the stability of the solvent during high voltage charging can be increased.

Examples of the electrolytic salt preferably used for a non-aqueous electrolyte include a perchlorate of lithium, a lithium salt of organic boron, a salt of a fluorine-containing compound such as trifluoromethanesulfonate, or an imide salt. Examples of the electrolytic salt includes $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3 (n \geq 2)$, and $LiN(Rf_3OSO_2)_2$ (where Rf represents a fluoroalkyl group). One of the above may be used independently or two or more of them may be used together. Among them, $LiPF_6$ and $LiBF_4$ are more preferably used since they have a good charge/discharge characteristic. This is because these fluorine-containing lithium salts have a high anionic characteristic, and are easily ion-decomposed and dissolved in the solvent. The concentration of the electrolytic salt in the solvent is normally from 0.5 mol/L to 1.7 mol/L though not particularly specified to this range.

In order to improve characteristics such as the stability, charge/discharge cycle characteristic, and storage characteristic at high temperatures, an additive such as vinylene carbonates, 1,3-propanesultone, diphenyl disulfide, cyclohexylbenzene, biphenyl, fluorobenzene, and t-butylbenzene may be added as required.

In a non-aqueous rechargeable battery according to the first embodiment, a laminated electrode body having a positive electrode according to the first embodiment and the above-described negative electrode placed on each other through a separator and a rolled electrode body having the layered electrode body rolled in a spiral form are produced, and the electrode body and the above-described non-aqueous electrolyte are sealed in an outer container according to a conventional method. The battery has various forms such as well-known non-aqueous rechargeable batteries, tubular batteries using a tubular (cylindrical or square tube) outer can, flat batteries (a flat shape having a circular or square shape when viewed from the top), and soft package batteries sealed having an outer container made of a laminate film of a vapor-deposited metal. The outer can may be made of steel or aluminum.

A non-aqueous rechargeable battery according to the first embodiment of the present invention may have applications for power supplies for various electronic devices such as a portable electronic device such as a cell phone and a notebook type computer as well as for safety conscious electric tools, an automobile, a bicycle, and power storage.

INVENTIVE EXAMPLES

Now, a non-aqueous rechargeable battery according to the first embodiment of the present invention will be described by referring to inventive examples. Note however that the following inventive examples by no means limit the present invention.

Inventive Example 1

Synthesizing Positive Electrode Active Material

Ammonia water having its pH adjusted to about 12 by addition of sodium hydroxide was placed into a reaction container, strongly stirred while a mixture aqueous solution containing nickel sulfate, manganese sulfate, and cobalt sulfate in concentrations of 2.4 mol/dm$^3$, 0.8 mol/dm$^3$, and 0.8 mol/dm$^3$, respectively and ammonia water in a concentration of 25% by mass were dropped using a constant rate pump in ratios of 23 cm$^3$/min and 6.6 cm$^3$/min, respectively to synthesize a coprecipitation compound (spherical coprecipitation compound) of Ni, Mn, and Co. Note that at the time, the temperature of the reaction liquid was kept at 50° C., and a sodium hydroxide aqueous solution in a concentration of 6.4 mol/dm$^3$ was concurrently dropped and a nitrogen gas was bubbled at a flow rate of 1 dm$^3$/min so that the pH of the reaction liquid was kept close to 12.

The coprecipitation compound was washed with water, filtered and dried to obtain a hydroxide including Ni, Mn, and Co in a mole ratio of 6:2:2. 0.196 mol of the hydroxide and 0.204 mol of LiOH.H$_2$O were dispersed in ethanol and made into slurry, then mixed for 40 minutes using for example a planetary ball mill and dried at room temperatures to obtain a mixture. Then, the mixture was placed in an alumna melting pot and heated to 600° C. in a dry air flow at 2 dm$^3$/min, and kept at the temperature for two hours for preheating, then baked at a raised temperature of 900° C. for 12 hours to synthesize lithium nickel composite oxide.

The obtained lithium nickel composite oxide was washed with water. After the washing, the oxide was thermally treated at 850° C. for 12 hours in the air (with an oxide concentration of about 20 vol %), then ground in a mortar into powder to obtain a positive electrode active material. The positive electrode active material was stored in a desiccator.

When the positive electrode active material (powder of the lithium nickel composite oxide) was measured for its composition using an atomic absorption spectrophotometer, the material was determined to have a composition represented by $Li_{1.02}Ni_{0.6}Mn_{0.20}Co_{0.20}O_2$. The measurement result for the specific surface area of the positive electrode active material was 0.3 m$^2$/g. Then, 20 g of the positive electrode active material was added into 100 ml of pure water and mixed and stirred for one hour at room temperatures in a nitrogen atmosphere, and when the supernatant of the mixture was titrated with hydrochloric acid with 0.2 mol/l, the titer was 9.3 ml.

Preparing Positive Electrode Material 100 parts by mass of the positive electrode active material and 0.3 parts by mass of 3-methacryloxypropyltrimethoxysilane were stirred for 30 minutes using a planetary mixer to obtain a positive electrode material having a coating layer of the organic silane compound on a surface of the positive electrode active material.

Preparing Positive Electrode

An amount of the positive electrode material to provide 100 parts by mass of the positive electrode active material, 20 parts by mass of an NMP solution including PVDF as a binder in a concentration of 10% by mass, 1 part by mass of artificial graphite as a conduction aid, and 1 part by mass of Ketjen black were mixed and kneaded using a planetary mixer, and then the viscosity of the mixture was adjusted with further NMP to prepare a positive electrode mixture containing composition.

The positive electrode mixture containing composition was applied on both surfaces of an aluminum foil (a positive electrode collector) having a thickness of 15 µm, and then vacuum drying was carried out at 120° C. for 12 hours, so that a positive electrode mixture layer was formed on both surfaces of the aluminum foil. Then, press treatment was carried out to adjust the thickness and density of the positive electrode mixture layer, a nickel lead member was welded to an exposed part of the aluminum foil to produce a strip-shaped positive electrode having a length of 375 mm and a width of 43 mm.

Producing Negative Electrode

Water is added to 97.5 parts by mass of natural graphite having a number average grain size of 10 µm as a negative electrode active material, 1.5 parts by mass of styrene butadiene rubber as a binder, 1 part by mass of carboxymethyl cellulose as a thickener were added with water to prepare negative electrode mixture containing paste. The negative electrode mixture containing paste was applied on both surfaces of a copper foil as thick as 8 µm, and then subjected to vacuum drying for 12 hours at 120° C. and a negative electrode mixture layer was formed on both surfaces of the copper foil. Then, press treatment was carried out to adjust the thickness and density of the negative electrode mixture layer, a nickel lead member was welded to an exposed part of the copper foil, and a strip shaped negative electrode having a length of 380 mm and a width of 44 mm was produced.

Preparing Non-aqueous Electrolyte

LiPF$_6$ was dissolved in a concentration of 1 mol/L in a mixture solvent including EC, MEC, and DEC in a volume ratio of 2:3:1 to prepare a non-aqueous electrolyte.

Assembling Battery

Figure 2:
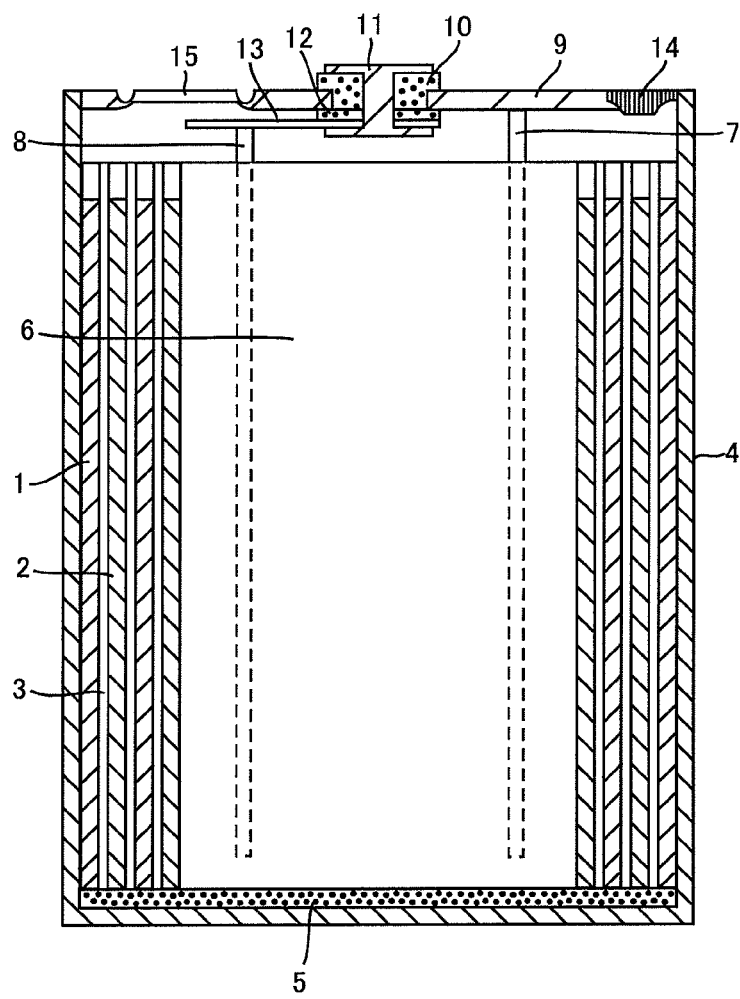
FIG. 2 is a sectional view of the non-aqueous rechargeable battery taken along line II-II in FIG. 1.
Figure 3:
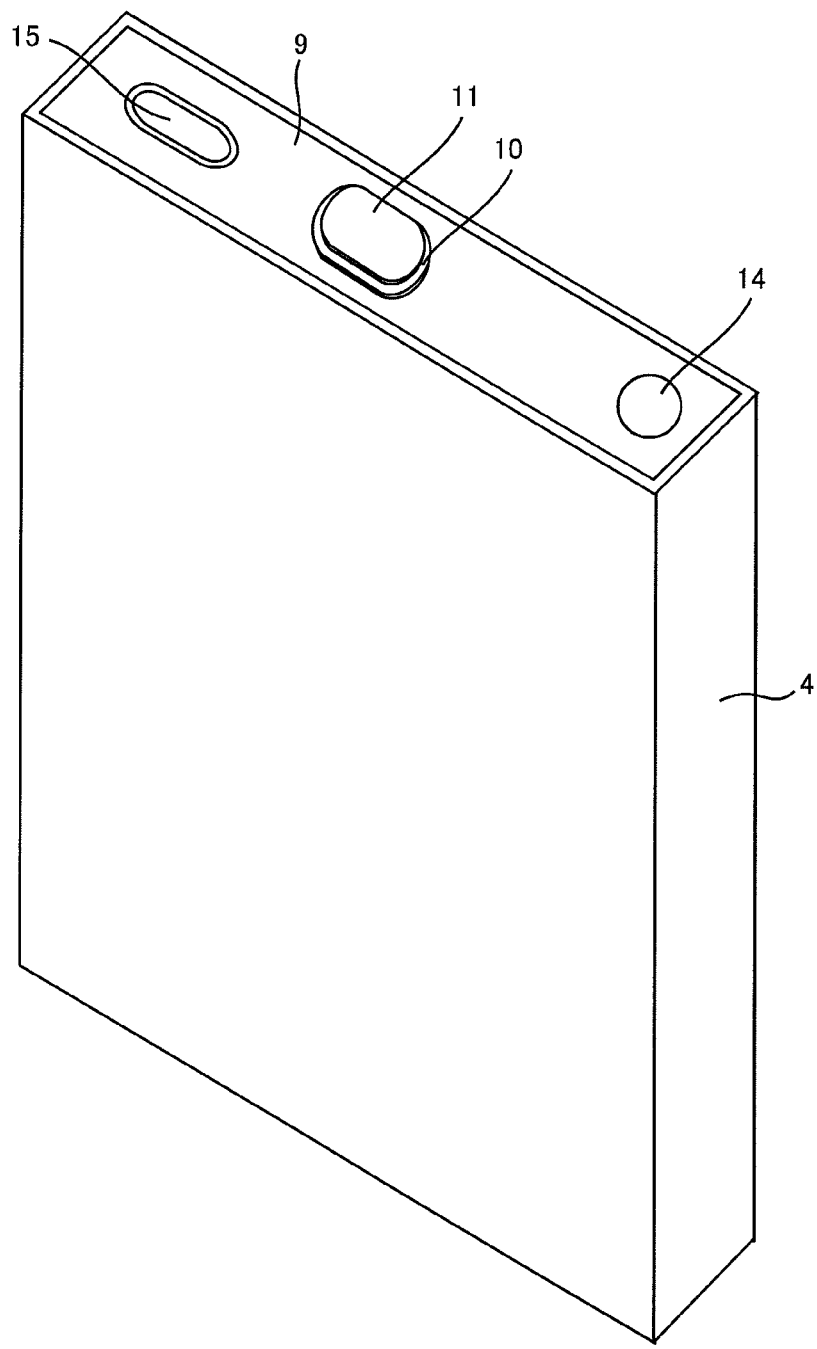
FIG. 3 is a perspective view of the non-aqueous rechargeable battery shown in FIGS. 1 and 2.

The above-described positive electrode was placed on the strip shaped negative electrode through a microporous polyethylene separator (porosity: 41%) with a thickness of 16 µm and rolled in a spiral manner, then pressurized into a flat rolled electrode member, and the rolled electrode member was fixed with polypropylene insulating tape. Then, the rolled electrode member was inserted into an aluminum alloy square battery case having a thickness of 4.0 mm, a width of 34 mm, and a height of 50 mm as an outer size, a lead member was welded, and an aluminum alloy lid plate was welded on an opening end of the battery case. Then, a non-aqueous electrolyte was injected from an injection inlet provided at the lid plate, let to stand for 1 hour, then the injection inlet was sealed and a non-aqueous rechargeable battery with a structure as shown in FIGS. 1 and 2 and an appearance as shown in FIG. 3 was obtained. Note that the design electric capacity of the non-aqueous rechargeable battery was 800 mAh.

As for the battery as shown in FIGS. 1 to 3, FIG. 1 is a plan view of the non-aqueous rechargeable battery, and FIG. 2 is a sectional view of the non-aqueous rechargeable battery taken along line II-II shown in FIG. 1. FIG. 3 is a perspective view of the non-aqueous rechargeable battery shown in FIGS. 1 and 2.

As shown in FIG. 2, the positive electrode 1 and the negative electrode 2 were rolled in a spiral manner through the separator 3 and pressurized into a flat shape to be a flat rolled electrode member 6, which was stored in a square (square tube) battery case 4 together with non-aqueous electrolyte. However, in FIGS. 1 and 2, a metal foil as a collector or the non-aqueous electrolyte used to produce the positive electrode 1 and the negative electrode 2 are not shown so that the illustration will not be complicated.

The battery case 4 forms an aluminum alloy outer body for a battery and also functions as a positive electrode terminal. An insulator 5 made of a polyethylene sheet was provided at the bottom of the battery case 4 and a positive electrode lead member 7 and a negative electrode lead member 8 connected to ends of the positive electrode 1 and the negative electrode 2, respectively are extracted from the flat rolled electrode member 6 of the positive electrode 1, the negative electrode 2, and the separator 3. A stainless steel terminal 11 is attached to an aluminum alloy sealing lid plate 9 that seals the opening of the battery case 4 through a polypropylene insulating packing 10, and a stainless steel lead plate 13 is attached to the terminal 11 through an insulator 12.

The lid plate 9 is inserted in to the opening of the battery case 4, the joining parts of them are welded, so that the opening of the battery case 4 is sealed and the inside of the battery is enclosed. The battery shown in FIGS. 1 and 2 has a non-aqueous electrolyte injection inlet 14 at the lid plate 9 and the non-aqueous electrolyte injection inlet 14 was sealed by welding such as laser welding as a seal member is inserted in the inlet, so that the sealing condition of the battery is secured. (Therefore, in the battery shown in FIGS. 1 to 3, the non-aqueous electrolyte injection inlet 14 actually includes the non-aqueous electrolyte inlet and the sealing member, but it is shown simply as the non-aqueous electrolyte inlet 14 for the ease of illustration). Furthermore, the lid plate 9 is provided with a cleavage vent 15 as a mechanism used to let inner gas outside when the battery temperature is raised.

In the battery according to Inventive Example 1, the positive electrode member 7 is directly welded to the lid plate 9, so that the battery case 4 and the lid plate 9 function as a positive electrode terminal, while the negative lead member 8 is welded to the lead plate 13 and the negative lead member 8 and the terminal 11 are electrically conducted through the lead plate 13, so that the terminal 11 serves as a negative electrode terminal, but their polarities may be reversed for example depending on the materials for the battery case 4.

FIG. 3 is a perspective view schematically showing the external appearance of the non-aqueous rechargeable battery shown in FIGS. 1 and 2. FIG. 3 is included for the purpose of showing that the battery is a square shaped battery, and FIG. 2 schematically shows the battery, in other words, it shows only particular components of those forming the battery. Also in FIG. 1, the part of the electrode member on the inner circumferential side is not shown as a sectional view.

Inventive Example 2

Ammonia water having its pH adjusted to about 12 by adding sodium hydroxide was placed in a reaction container and strongly stirred, into which a mixture aqueous solution including nickel sulfate, cobalt sulfate, and aluminum sulfate in concentrations of 3.28 mol/dm$^3$, 0.6 mol/dm$^3$, and 0.12 mol/dm$^3$, respectively, and 25% by mass of ammonia water were dropped in ratios of 23 cm$^3$/min and 6.6 cm$^3$/min, respectively using a constant rate pump, and a coprecipitation compound (spherical coprecipitation) of Ni, Co, and Al was synthesized. At the time, a sodium hydroxide aqueous solution in a concentration of 6.4 mol/dm$^3$ was concurrently dropped and nitrogen gas was bubbled at a flow rate of 1 dm$^3$/min so that the pH of the reaction liquid was kept close to 12.

The coprecipitation compound was washed with water, filtered and dried, and a hydroxide containing Ni, Co, and Al in a mol ratio of 82:15:3 was obtained. 0.196 mol of the hydroxide and 0.204 mol of LiOH.H$_2$O were dispersed in ethanol and formed into slurry, then mixed for 40 minutes using a planetary ball mill, followed by drying at room temperatures to obtain a mixture. Then, the mixture was placed in an alumina melting pot, heated to 600° C. with dry air flow at 2 dm$^3$/min, kept at the temperature for 2 hours for preheating, and baked for 12 hours at a raised temperature of 725° C., and a lithium nickel composite oxide was synthesized.

The obtained lithium nickel composite oxide was washed with water. After the washing, the oxide was thermally treated in the atmosphere (with an oxygen concentration of about 20 vol %) at 700° C. for 12 hours, then ground into powder in a mortar to obtain a positive electrode active material. The positive electrode active material was kept in a desiccator.

When the positive electrode active material (powder of the lithium nickel composite oxide) was measured for its composition using an atomic absorption spectrometer, it was found that the material had a composition represented by $Li_{1.02}Ni_{0.82}Co_{0.15}Al_{0.03}O_2$. The specific surface area of the positive electrode active material was determined to be 0.3 m$^2$/g. Then, 20 g of the positive electrode active material was added to 100 ml of pure water, mixed and stirred for 1 hour at room temperatures and in a nitrogen atmosphere. The supernatant of the obtained mixture was titrated with 0.2 mol/l hydrochloric acid and the titer was 17.3 ml.

100 parts by mass of the positive electrode active material and 0.25 parts by mass of 3-glycidoxypropyltrimethoxysilane as an organic silane compound were stirred for 30 minutes using a planetary mixer, and a positive electrode material having a coating layer of the organic silane compound on the surface of the positive electrode active material was obtained.

Except that the above positive electrode material was used, a positive electrode was produced in the same manner as Inventive Example 1, and a non-aqueous rechargeable battery was produced in the same manner as Inventive Example 1 except that this positive electrode was used.

Inventive Example 3

A positive electrode material was prepared in the same manner as Inventive Example 1 except that vinyltriethoxysilane was used as an organic silane compound and its amount was 1.0 part by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 4

A positive electrode material was prepared in the same manner as Inventive Example 1 except that bis(triethoxysilylpropyl)tetrasulfide was used as an organic silane compound and its amount was 0.1 part by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 5

A positive electrode material was prepared in the same manner as Inventive Example 1 except that 3-mercaptopropylmethyldimethoxysilane was used as an organic silane compound and its amount was 1.0 part by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 6

A positive electrode material was prepared in the same manner as Inventive Example 2 except that 3-aminopropyltriethoxysilane was used as an organic silane compound and its amount was 0.6 parts by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 7

A positive electrode material was prepared in the same manner as Inventive Example 2 except that 3-mercaptopropyltrimethoxysilane was used as an organic silane compound and its amount was 0.9 parts by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 8

A positive electrode material was prepared in the same manner as Inventive Example 1 except that the amount of 3-methacryloxypropyltrimethoxysilane as an organic silane compound was 5 parts by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 9

A positive electrode material was prepared in the same manner as Inventive Example 2 except that the amount of 3-glycidoxypropyltrimethoxysilane as an organic silane compound was 4 parts by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 10

A positive electrode material was prepared in the same manner as Inventive Example 1 except that the amount of 3-methacryloxypropyltrimethoxysilane as an organic silane compound was 0.02 parts by mass relative to 100 parts by mass of the positive electrode active material.

A positive electrode was produced in the same manner as Inventive Example 1 except that the above positive electrode material was used, and a non-aqueous rechargeable battery was produced in the same manner as Inventive Example 1 except that this positive electrode was used.

Inventive Example 11

A positive electrode active material represented by $Li_{1.02}Ni_{0.90}Co_{0.05}Mn_{0.03}Mg_{0.02}O_2$ was synthesized in the same manner as Inventive Example 2 except that the composition of the coprecipitate was different. The specific surface area of the positive electrode active material was determined to be 0.4 m$^2$/g. Then, 20 g of the positive electrode active material was added to 100 ml of pure water and the mixture was stirred for 1 hour at room temperatures and in a nitrogen atmosphere. The supernatant was titrated with 0.2 mol/l hydrochloric acid and the titer was 103.2 ml.

100 parts by mass of the positive electrode active material and 0.7 parts by mass of 3-mercaptopropyltrimethoxysilane as an organic silane compound were stirred for 30 minutes using a planetary mixer, and a positive electrode material having a coating layer of the organic silane compound on the surface of the positive electrode active material was obtained.

A positive electrode was produced in the same manner as Inventive Example 1 except that the above positive electrode material was used and a non-aqueous rechargeable battery was produced in the same manner as Inventive Example 1 except that this positive electrode was used.

Inventive Example 12

A positive electrode active material represented by $Li_{1.02}Ni_{0.08}Co_{0.10}Mn_{0.10}O_2$ was synthesized in the same manner as Inventive Example 2 except that the composition of the coprecipitation compound was different. The specific surface area of the positive electrode active material was determined to be 0.5 m$^2$/g. 20 g of the positive electrode active material was added to 100 ml of pure water and the supernatant obtained after mixing and stirring it for 1 hour at room temperatures and in a nitrogen atmosphere was titrated with 0.2 mol/l hydrochloric acid and the titer was 70.8 ml.

100 parts by mass of the positive electrode active material and 0.4 parts by mass of bis(triethoxysilylpropyl)tetrasulfide were stirred for 30 minutes using a planetary mixer to obtain a positive electrode material having a coating layer of the organic silane compound on the surface of the positive electrode active material.

A positive electrode was produced in the same manner as Inventive Example 1 except that the above positive electrode material was used and a non-aqueous rechargeable battery was produced in the same manner as Inventive Example 1 except that this positive electrode was used.

Inventive Example 13

A non-aqueous rechargeable battery was produced in the same manner as Inventive Example 1 except that 3-methacryloxypropyltrimethoxysilane as an organic silane compound was replaced by tetrakis(2-ethylhexyloxy)titanium.

Comparative Example 1

A positive electrode was produced in the same manner as Inventive Example 1 except that a positive electrode material was used without being mixed with an organic silane compound and a non-aqueous rechargeable battery was produced in the same manner as Inventive Example 1 except that this positive electrode was used.

Comparative Example 2

A positive electrode was produced in the same manner as Inventive Example 2 except that the positive electrode active material was used without being mixed with an organic silane compound and a non-aqueous rechargeable battery was produced in the same manner as Inventive Example 1 except that this positive electrode was used.

Comparative Example 3

A positive electrode active material was obtained in the same manner as Inventive Example 1 except that the lithium nickel composite oxide synthesized in Inventive Example 1 was not washed with water. The specific surface area of the positive electrode active material was determined to be 0.3 m²/g. The supernatant obtained after 20 g of the positive electrode active material was added to 100 ml of pure water and stirred for 1 hour at room temperatures and in a nitrogen atmosphere was titrated with 0.2 mol/l hydrochloric acid. The titer was 168 ml.

A positive electrode material was prepared in the same manner as Inventive Example 1 except that the above described positive electrode active material was used and a non-aqueous rechargeable battery was produced in the same manner as Example 1 except that this positive electrode was used.

Comparative Example 4

A positive electrode active material was obtained in the same manner as Inventive Example 2 except that the above described lithium nickel composite oxide synthesized in Inventive Example 2 was not washed with water. The specific surface area of the positive electrode active material was determined to be 0.3 m²/g. Then, 20 g of the positive electrode active material was added to 100 ml of pure water and mixed and stirred for 1 hour at room temperatures and in a nitrogen atmosphere. The supernatant was titrated with 0.2 mol/l hydrochloric acid, and the titer was 195 ml.

A positive electrode material was prepared in the same manner as Inventive Example 1 except that the above-described positive electrode active material was used, a positive electrode was produced in the same manner as Inventive Example 1 except that this positive electrode material was used, and a non-aqueous rechargeable battery was produced in the same manner as Inventive Example 1 except that this positive electrode was used.

The non-aqueous rechargeable batteries in Inventive Examples 1 to 13 and Comparative Examples 1 to 4 and the positive electrode mixture containing compositions used for producing these non-aqueous rechargeable batteries were evaluated as follows. The result is given in Table 1. Note that Table 1 includes titers ("titer" in Table 1") each obtained by titrating the supernatant of a mixture of 20 g of a positive electrode active material used in each of the inventive examples and comparative examples and 100 ml of pure water with hydrochloric acid and the amount of the organic silane compound or organic compound relative to 100 parts by mass of the positive electrode active material in the positive electrode material ("amount of organic silane compound" in Table 1).

Measuring Capacity

The batteries obtained in Inventive Examples 1 to 13 and Comparative Examples 1 to 4 were stored at 60° C. for 7 hours, and then a charge/discharge cycle to charge with current at 200 mA for 5 hours at 20° C. followed by discharge at 200 mA until the battery voltage was lowered to 3V was repeated until the discharge capacity reached a prescribed value. Then, the batteries were subjected to constant current/constant voltage charging (constant current: 500 mA, constant voltage: 4.2 V, total charging time: 3 hours), allowed to rest for 1 hour, and then discharged at a current value of 200 mA until the battery voltage reached 2.5 V to obtain a standard capacity. Note that the standard capacity was measured for 100 batteries for each kind of batteries, and the average values were determined as standard capacities for the inventive examples and comparative examples.

Storage Characteristic

After the constant current/constant voltage charge (constant current: 0.4 C, constant voltage: 4.25 V, total charging time: 3 hours) was carried out to the batteries in Inventive Examples 1 to 13 and Comparative Examples 1 to 4, the batteries were allowed to stand in a constant temperature oven at 80° C. for 5 days, and the thicknesses of the batteries were measured. The storage characteristic was evaluated based on the swelling of the battery during storage obtained as the difference between the thus obtained thickness of each of the batteries and the thickness before storage (4.0 mm).

Evaluating Stability of Positive Electrode Mixture Containing Compositions

Changes over time in the viscosity of the positive electrode mixture containing compositions used for manufacturing the batteries in Inventive Examples 1 to 13 and Comparative Examples 1 to 4 were measured and the stability of each of the positive electrode mixture containing compositions was evaluated based on the measurement. More specifically, the positive electrode mixture containing compositions were evaluated for their stability by comparing their viscosities immediately after preparation and those after being rotated at room temperatures for 1 week using a mix rotor. In the table, the compositions whose viscosities were maintained after storage are designated by ⊚, those with relatively small increase in viscosity are designated by ○, and those with large increase in viscosity after the storage are designated by x.

| | Titer (ml) | Amount of organic compound (part by mass) | Standard capacity (mAh) | Swelling during storage (mm) | Stability of positive electrode mixture containing composition | Organic compound |
|---|---|---|---|---|---|---|
| Inv. Example 1 | 9.3 | 0.3 | 781 | 0.75 | ⊚ | 3-methacryloxypropyltrimethoxysilane |
| Inv. Example 2 | 17.3 | 0.25 | 827 | 0.83 | ⊚ | 3-glycidoxypropyltrimethoxysilane |
| Inv. Example 3 | 9.3 | 1.0 | 779 | 0.81 | ⊚ | vinyl triethoxysilane |
| Inv. Example 4 | 9.3 | 0.1 | 775 | 0.71 | ⊚ | bis(triethoxysilylpropyl)tetrasulfide |
| Inv. Example 5 | 9.3 | 1.5 | 770 | 0.77 | ⊚ | 3-mercaptopropylmethyldimethoxysilane |
| Inv. Example 6 | 17.3 | 0.6 | 820 | 0.86 | ⊚ | 3-aminopropyltriethoxysilane |
| Inv. Example 7 | 17.3 | 0.9 | 831 | 0.81 | ⊚ | 3-mercaptopropyltrimethoxysilane |
| Inv. Example 8 | 9.3 | 5 | 752 | 0.79 | ⊚ | 3-methacryloxypropyltrimethoxysilane |
| Inv. Example 9 | 17.3 | 4 | 810 | 0.9 | ⊚ | 3-glycidoxypropyltrimethoxysilane |
| Inv. Example 10 | 9.3 | 0.02 | 788 | 0.91 | ○ | 3-methacryloxypropyltrimethoxysilane |
| Inv. Example 11 | 103.2 | 0.7 | 853 | 0.93 | ○ | 3-mercaptopropyltrimethoxysilane |
| Inv. Example 12 | 70.8 | 0.4 | 808 | 0.88 | ○ | bis(triethoxysilylpropyl)tetrasulfide |
| Inv. Example 13 | 11.3 | 0.3 | 772 | 0.85 | ⊚ | tetrakis(2-ethylhexyloxy)titanium |
| Comp. Example 1 | 9.3 | 0 | 785 | 1.12 | X | None |
| Comp. Example 2 | 17.3 | 0 | 825 | 1.24 | X | None |

|  | Titer (ml) | Amount of organic compound (part by mass) | Standard capacity (mAh) | Swelling during storage (mm) | Stability of positive electrode mixture containing composition | Organic compound |
| --- | --- | --- | --- | --- | --- | --- |
| Comp. Example 3 | 168 | 0.3 | 778 | 2.02 | X | 3-methacryloxypropyltrimethoxysilane |
| Comp. Example 4 | 195 | 0.25 | 819 | 2.32 | X | 3-glycidoxypropyltrimethoxysilane |

The non-aqueous rechargeable batteries produced using a positive electrode material having a coating layer of an organic silane compound on a surface of lithium nickel composite oxide as a positive electrode active material each had reduced swelling after the storage test and had a good high temperature storage characteristic. The positive electrode mixture containing compositions used for producing the non-aqueous rechargeable batteries in Inventive Examples 1 to 12 had high stability and restrained gelation. Therefore, the non-aqueous rechargeable batteries in Inventive Examples 1 to 12 had good productivity.

Note that the non-aqueous rechargeable batteries in Inventive Examples 8 and 9 had small swelling during high temperature storage and their positive electrode mixture containing compositions had good stability but their capacities were smaller than those of the batteries in Inventive Examples 1 and 2. This is probably because a large amount of the organic silane compound introduced in the positive electrode mixture layer and the excess organic silane compound interferes with charge/discharge reactions of the batteries.

On the other hand, the non-aqueous rechargeable battery in Inventive Example 10 had slightly greater swelling during high temperature storage and slightly lower stability for the positive electrode mixture containing composition than the non-aqueous rechargeable battery in Inventive Example 1. This is probably because a reduced amount of the organic silane compound introduced in the positive electrode mixture layer caused the difference in the effect.

As for the non-aqueous rechargeable batteries in Inventive Examples 11 and 12, a slightly large alkali content in the positive electrode active material causes slight degradation in stability as compared to the positive electrode mixture containing compounds used for Inventive Examples 1 to 9.

Furthermore, a non-aqueous rechargeable battery produced using a positive electrode produced using a positive electrode material having a coating layer of tetrakis(2-ethylhexyloxy)titanium as an organic silane compound in Inventive Example 13 had small swelling after the storage test and a good high temperature storage characteristic.

In contrast, the batteries in Comparative Examples 1 to 4 had large swelling after the storage test, and it is assumed that this is because of gas generated inside these batteries. The positive electrode mixture containing compositions used for producing the batteries in Comparative Examples 1 to 4 had increased viscosity after the storage in stability evaluation and gelation had progressed for a short period of time. It is presumed that the non-aqueous rechargeable batteries in Comparative Examples 3 and 4 each had a positive electrode active material coated with an organic silane compound, but an excess amount of alkali component degraded the coating effect of the organic silane compound.

Second Embodiment

Positive Electrode Material

A positive electrode material according to the second embodiment includes a positive electrode active material containing a lithium nickel composite oxide represented by the above-described general compositional formula (1), a coating layer formed on a surface of the positive electrode active material and made of an organic silane compound, an alkaline component whose content is from 0.01% to 2%, and elemental sulfur included in a layer between the positive electrode active materials.

More specifically, the positive electrode material according to the second embodiment is produced by adding elemental sulfur contained in a layer between the positive electrode active materials to the positive electrode material according to the first embodiment, and the other constituents are the same as those of the positive electrode material according to the first embodiment.

In this way, the presence of elemental sulfur in the layer between the positive electrode active materials reduces elution of metal ions from the positive electrode material. As a result, reduction in the capacity of the negative electrode can be suppressed. Such reduction of elution of metal ions from the positive electrode material particularly maximizes the effect of suppressing a drop in the capacity of the negative electrode when the negative electrode contains a material including Si and O as constituent element.

The positive electrode active material included in the positive electrode material according to the second embodiment has the same composition as that described in connection with the first embodiment and synthesized by the method described according to the first embodiment. Therefore, in the description of the second embodiment, the composition of the positive electrode active material and the method of synthesizing the positive electrode active material will not be included.

The organic silane compound is for example a compound represented by a general formula $X^1$—$Si(OR^1)_3$ or $X^2$—$SiR^2(OR^3)_2$. Here, in the general formula, $R^1$, $R^2$ and $R^3$ each consist of one of —$CH_3$, —$C_2H_5$ and —$C_3H_7$, and $R^2$ and $R^3$ may be either the same or different. In the general formula, $X^1$ and $X^2$ each consist of any of various functional groups containing sulfur.

More specifically, examples of the organic silane compound include an organic silane compound having a mercapto group and an organic silane compound having a sulfide group. Examples of the organic silane compound having a mercapto group include 3-mercaptopropylmethyldimethoxysilane and 3-mercaptopropyltrimethoxysilane. The organic silane compound having a sulfide group is for example bis(triethoxysilylpropyl)tetrasulfide.

One of the above-described organic silane compounds may be used independently or two or more of them may be used together. Among the above-described organic silane compounds, organic silane compounds whose boiling points are not less than 200° C. are more preferably used. Organic silane compounds whose boiling points are not more than 200° C. tend to be volatile in a positive electrode mixture containing composition that will be described, which reduces the effects brought about by using the organic silane compound.

The positive electrode material according to the second embodiment is produced by a method of mechanically stirring and mixing a positive electrode active material represented by the general composition formula (1) and an organic silane compound containing elemental sulfur. The positive electrode active material has its surface coated with the organic silane compound by the stirring and the elemental sulfur exists in a layer between the positive electrode active materials.

The positive electrode material according to the second embodiment is produced by spraying a solution obtained by dissolving an organic silane compound containing elemental sulfur in a solvent to the positive electrode active material represented by the general composition formula (1) and removing the solvent by drying or the like. The spraying and drying have a surface of the positive electrode active material coated with the organic silane compound, and elemental sulfur is present between the positive electrode active materials.

In this way, the positive electrode material according to the second embodiment has a positive electrode active material having its surface coated with a coating layer of the organic silane compound containing elemental sulfur. Therefore, the positive electrode material according to the second embodiment includes the elemental sulfur contained in the layer (coating layer) between the positive electrode active materials.

A solvent to have the organic silane compound containing elemental sulfur dissolved therein is the same solvent described in connection with the first embodiment.

The other part of the method of manufacturing a positive electrode material according to the second embodiment is the same as that of the first embodiment.

The amount of an organic silane compound containing elemental sulfur in mixing a positive electrode active material and the organic silane compound is the same as that described in connection with the first embodiment.

Note that the organic compound including elemental sulfur does not have to be an organic silane compound and may be any of a sulfur containing heterocyclic compound such as sulfide, disulfide, sulfonamide, a sulfonic acid, and thiophene, thiol, sulfate, and an alkylsulfonyl compound (organic sulfur compound).

When the organic compound including elemental sulfur is made of any of these organic sulfur compounds, the positive electrode material is produced by the above-described method. The positive electrode material produced by an organic sulfur compound has a positive electrode material having its surface coated with a coating layer of an organic sulfur compound similarly to the positive electrode material produced using an organic silane compound containing elemental sulfur, which suppresses elution of metal ions from the positive electrode material. The positive electrode material produced using an organic sulfur compound provides the same effects as those of the positive electrode material produced using an organic silane compound containing elemental sulfur.

The amount of the organic sulfur compound when the positive electrode active material and the organic sulfur compound are mixed is the same as the amount of an organic silane compound when a positive electrode active material and an organic silane compound are mixed.

Furthermore, the amount of an organic sulfur compound relative to 100 parts by mass of a positive electrode active material is A (parts by mass) and the specific surface area of the positive electrode active material is B ($m^2/g$), A/B is from 0.01 to 50.

Positive Electrode for Non-Aqueous Rechargeable Battery

A positive electrode for a non-aqueous rechargeable battery according to the second embodiment includes a positive electrode collector and a positive electrode mixture layer formed on a surface (one or both surfaces) of the positive electrode collector. The positive electrode mixture layer includes a positive electrode material according to the second embodiment described above and a binder.

The collector for use in a non-aqueous rechargeable battery according to the second embodiment is the same as that described in connection with the first embodiment.

The positive electrode for a non-aqueous rechargeable battery according to the second embodiment is produced by the steps of forming a composition (positive electrode mixture containing composition) including the above-described positive electrode material and a binder, applying the positive electrode mixture containing composition on one or both surfaces of the collector and drying.

More specifically, the electrode for the non-aqueous rechargeable battery is produced by the steps of preparing a paste or slurry positive electrode mixture containing composition by dispersing a mixture of the positive electrode active material produced by the above-described method and an organic silane compound (including elemental sulfur) and a binder in a solvent (for example, an organic solvent such as NMP), applying the positive electrode mixture containing composition on one or both surfaces of a collector and drying the composition, carrying out press-treatment if necessary thereby adjusting the thickness and density of a positive electrode mixture layer.

Note that when the mixture, binder and conduction aid are dispersed in a solvent, the binder may be dissolved in the solvent in advance.

The binder is the same as that described in conjunction with the first embodiment, and the amount of the binder is the same as that described in conjunction with the first embodiment.

In the positive electrode mixture containing composition, the organic silane compound is believed to coat a surface of the positive electrode active material. In this way, moisture in the air or the positive electrode mixture containing composition that adsorbs to the positive electrode active material can be reduced significantly. As a result, an alkaline component can be suppressed from being newly generated because of a reaction between the positive electrode active material and moisture. Therefore, the swelling of the non-aqueous rechargeable battery during storage at high temperatures because of gas attributable to the alkaline component can be reduced.

Since the positive electrode containing composition contains an organic silane component including elemental sulfur, elution of metal ions from the positive electrode for the non-aqueous rechargeable battery is reduced. Metal ions eluted from the positive electrode for the non-aqueous rechargeable battery degrades the capacity of SiO including in the negative electrode. Therefore, as elution of the metal ions from the positive electrode for the non-aqueous rechargeable battery is reduced, degradation of the non-aqueous rechargeable battery by charge/discharge cycles can be reduced. Elution of metal ions when the non-aqueous rechargeable battery is stored at high temperatures is reduced, so that the capacity of the non-aqueous rechargeable battery can be less reduced.

Furthermore, also according to the second embodiment, a positive electrode for a non-aqueous rechargeable battery may be produced by adding a conduction aid if necessary, and in this case, an organic silane compound containing elemental sulfur serves as if it is a dispersion agent to the conduction aid in the positive electrode mixture containing composition and improves the dispersion of the conduction aid. As a result, the positive electrode mixture containing composition has improved stability, and the improvement in the dispersion of the conduction aid can improve the load characteristic of the non-aqueous rechargeable battery.

These effects improve the stability of the positive electrode mixture containing composition and hence its long term storage characteristic and the rejection rate is reduced. Therefore, the productivity of the positive electrode for the non-aqueous rechargeable battery and the productivity of the non-aqueous rechargeable battery using the positive electrode for the non-aqueous rechargeable battery can be increased.

The organic silane compound containing elemental sulfur further provides the effects described in conjunction with the first embodiment.

When a positive electrode mixture containing composition is produced using a conduction aid, the conduction aid and its amount are the same as those described in conjunction with the first embodiment. When the positive electrode mixture containing composition is produced using a conduction aid, a positive electrode for a non-aqueous rechargeable battery is produced by the steps of preparing a paste or slurry positive electrode mixture containing composition by dispersing a mixture of the positive electrode active material produced by the above-described method and an organic silane compound (including elemental sulfur) and a binder in a solvent (an organic solvent such as NMP), applying the positive electrode mixture containing composition on one or both surfaces of a collector, drying it, and carrying out press-treatment if necessary thereby adjusting the thickness and density of a positive electrode mixture layer.

Note that the paste or slurry positive electrode containing composition may be prepared may be prepared by dispersing a positive electrode active material, an organic silane compound (including elemental sulfur) and a binder in a solvent instead of forming a mixture of the positive electrode active material and the organic silane compound (including elemental sulfur) in advance.

Instead of forming a mixture of a positive electrode active material and an organic silane compound (including elemental sulfur) in advance, the positive electrode active material, the organic silane compound (including elemental sulfur), a binder, and a conduction aid may be dispersed in a solvent, and a paste or slurry type positive electrode mixture containing composition may be prepared.

In this case, the organic silane compound (including elemental sulfur) coats a surface of the positive electrode active material in the process of being dispersed in the solvent. As a result, the above described effects are obtained. The organic silane compound (including elemental sulfur) adsorbs to the conduction aid. As a result, the stability of paints improves.

The positive electrode mixture containing composition after being applied on the surface of the positive electrode collector is preferably dried while being heated. It is believed that thus drying while heating the positive electrode mixture containing composition allows a positive electrode mixture layer to be formed more quickly, and a reaction of the organic silane compound (including elemental sulfur) in the positive electrode mixture layer to proceed, so that the effect of reducing the swelling of the non-aqueous rechargeable battery during storage at high temperatures by the organic silane compound including elemental sulfur can be further expected.

Note that in view of allowing the reaction of the organic silane compound including elemental sulfur to further proceed, the drying temperature for the positive electrode mixture containing composition after being applied to a surface of the electrode collector is particularly preferably set to 120° C. or higher.

A positive electrode for a non-aqueous rechargeable battery may be produced by the above described method using the organic sulfur containing compound described above instead of the organic silane compound including elemental sulfur.

As for the other part of the positive electrode for the non-aqueous rechargeable battery according to the second embodiment, the description of the positive electrode for the non-aqueous rechargeable battery according to the first embodiment applies.

Non-Aqueous Rechargeable Battery

A non-aqueous rechargeable battery according to the second embodiment includes the above described positive electrode for the non-aqueous rechargeable battery, a negative electrode, a separator, and a non-aqueous electrolyte.

The negative electrode includes a negative electrode mixture layer that contains $SiO_y$ and graphite. $SiO_y$ consists of a complex of a material including Si and O as constituent elements (where the atomic ratio y of O relative to Si is $0.5 \leq y \leq 1.5$) and a conductive material.

$SiO_y$ may include microcrystalline or amorphous Si. In this case, the atomic ratio y of Si and O includes the microcrystalline or amorphous Si.

More specifically, a material including Si and O as constituent elements includes Si (such as microcrystalline Si) dispersed in a matrix of amorphous $SiO_2$ and it is only necessary that the atomic ratio y for the amorphous $SiO_2$ and Si dispersed therein together satisfies $0.5 \leq y \leq 1.5$.

For example, when Si is dispersed in a matrix of amorphous $SiO_2$, and the mol ratio of $SiO_2$ and Si of the material is 1:1, the material including Si and O as constituent elements is represented by SiO because y=1.

As for the material with this structure, a peak caused by the presence of Si (microcrystalline Si) is not observed in some cases by X-ray diffraction analysis, but the presence of fine Si can be observed by examining using a transmission electron microscope.

The conductive material is for example a carbon material. The complex includes $SiO_y$ having its surface coated with the conductive material (carbon material). $SiO_y$ that is an oxide is not much conductive and therefore when $SiO_y$ is used as a negative electrode active material, a conductive material (conduction aid) is used in view of securing a good battery characteristic, and the mixing/dispersion between $SiO_y$ and the conductive material in the negative electrode must be good to form a good conductive network. A complex formed by $SiO_y$ and the conductive material has a better conductive network in the negative electrode than the case of using a mixture obtained by simply mixing $SiO_y$ and a conductive material. This is the reason why the complex formed by coating a surface of $SiO_y$ with a conductive material (carbon material) was used.

An example of the conductive material that may be used for forming a complex with $SiO_y$ includes a carbon material such as low crystalline carbon, carbon nanotubes and carbon fiber obtained by CVD (Chemical Vapor Deposition).

More specifically, the conductive material includes at least one selected from a fibrous or coil shaped carbon material, a fibrous or coil shaped metal, carbon black (including acetylene black and Ketjen black), artificial graphite, easily graphitizable carbon, and hardly graphitizable carbon.

A fibrous or coil-shaped carbon material or a fibrous or coil-shaped metal easily forms a conductive network and is preferable for its large surface area.

Carbon black (including acetylene black and Ketjen black), easily graphitizable carbon and hardly graphitizable carbon are preferably used because they have high electrical conductivity and a high liquid retaining property, and they also easily keep contact with $SiO_y$ particles if $SiO_y$ swells or shrinks.

Graphite used as a negative electrode active material together with $SiO_y$ may be used as a conductive material to form a complex of $SiO_y$ and a conductive material. Similarly to carbon black, graphite also has high electrical conductivity and a high liquid retaining property, easily keeps contact with SiO, particles if $SiO_y$ particles swell or shrink, and therefore graphite can be preferably used to form a complex with $SiO_y$.

Examples of such a fibrous carbon include poly acrylonitrile (PAN) based carbon fiber, pitch based carbon fiber, vapor phase deposited carbon fiber, and carbon nanotubes, and any of the above may be used.

Note that a fibrous carbon material or a fibrous metal may be formed for example on a surface of $SiO_y$ particles by vapor phase deposition.

The conductive material has a specific resistance value for example from $10^{-5}$ to 10 k $\Omega$cm which is lower than the specific resistance value of $SiO_y$ (from $10^3$ to $10^7$ k $\Omega$cm).

When a complex of $SiO_y$ and a conductive material is used as a negative electrode material, as for the ratio of $SiO_y$ and the conductive material, the conductive material is not less than 5 parts by mass relative to 100 parts by mass of $SiO_y$, more preferably not less than 10 parts by mass in view of providing the effects brought about by forming a complex of $SiO_y$ and the conductive material well.

As for the ratio of $SiO_y$ and a conductive material, the conductive material is not more than 95 parts by mass relative to 100 parts by mass of $SiO_y$, more preferably not more than 90 parts by mass. It is because in the complex of $SiO_y$ and the conductive material, if the ratio of the conductive material to form a complex with $SiO_y$ is too large, the amount of $SiO_y$ is reduced in the negative electrode mixture layer, which could reduce the effect of capacity increase.

A complex of $SiO_y$ and the conductive material is for example produced by the following method. $SiO_y$ is produced for example by sputtering. A dispersion liquid having $SiO_y$ dispersed in a dispersion medium is prepared, sprayed and dried, and composite particles including a plurality of particles is produced. In this case, ethanol or the like is used as the dispersion medium. The dispersion liquid is normally sprayed in an atmosphere at 50° C. to 300° C.

Then, hydrocarbon based gas is heated in a vapor phase and carbon generated by thermal decomposition of hydrocarbon is deposited on a surface of $SiO_y$ particles. In this way, a complex that includes $SiO_y$ particles having a surface coated with a carbon material is produced.

In this case, an appropriate temperature for vapor phase deposition is normally from 600° C. to 1200° C. though it varies depending on the kind of hydrocarbon based gas, and particularly preferably not less than 700° C., more preferably not less than 800° C. This is because as the processing temperature is higher, the amount of remaining impurities is reduced and a coating layer including carbon with high conductivity can be formed.

Hydrocarbon based gas is supplied from a liquid source and the liquid source is for example made of any of toluene, benzene, xylene, mesitylene and the like. Any of these substances is evaporated (for example by bubbling with nitrogen gas) to obtain hydrocarbon based gas.

In addition, the hydrocarbon based gas may be supplied from a gas source, examples of which include methane gas, ethylene gas, and acetylene gas.

In this way, using a vapor phase deposition method, the hydrocarbon gas reaches throughout into corners of $SiO_y$ particles and a thin homogeneous coating film (carbon coating layer) including a conductive carbon material may be formed at a surface of $SiO_y$ particles and inside holes at the surface. As a result, the $SiO_y$ particles can be provided with conductivity in a homogeneous manner with only a small amount of the carbon material.

Note that if $SiO_y$ and a conductive material are formed into a complex, a granulated body of $SiO_y$ and the conductive material may be produced by a mechanical method using for example a vibratory ball mill or a planetary ball mill and a rod mill.

A granulated body of $SiO_y$ and a conductive material whose specific resistance value is smaller than that of $SiO_y$ may be produced. In this case, such a conductive material is added in a dispersion liquid having $SiO_y$ dispersed in a dispersion medium, and composite particles (granulated body) may be produced by the same method as that applied when $SiO_y$ and a conductive material are formed into a complex.

When a granulated body of $SiO_y$ and a conductive material is produced, a fibrous carbon material is particularly preferably used as a conductive material used for a granulated body of $SiO_y$ and a conductive material among the above-described conductive materials. The fibrous carbon material in a thin string form has high flexibility and can therefore follow the swelling and shrinking of $SiO_y$, and may have many interfaces with $SiO_y$ particles for its high bulk density.

As a complex of $SiO_y$ and a conductive material, a complex having $SiO_y$ whose surface is coated with a conductive material (preferably a carbon material) may be further formed into a complex with another conductive material (such as a carbon material). Using such a complex, a good conductive network can be formed at a negative electrode, and therefore a non-aqueous rechargeable battery with increased capacity and a high charge/discharge cycle characteristic can be obtained. A complex of $SiO_y$ coated with a conductive material and another conductive material may be for example a granulated body obtained by further granulating a mixture of $SiO_y$ coated with a conductive material and another conductive material.

$SiO_y$ having a surface coated with a conductive material may be for example a complex (such as a granulated body) of $SiO_y$ and a conductive material having a specific resistance value smaller than $SiO_y$, preferably a complex that includes $SiO_y$ and a carbon material and has a surface coated with a carbon material. When $SiO_y$ and a conductive material are in a dispersed state, a better conductive network can be formed. Therefore, in a non-aqueous rechargeable battery including a negative electrode having such a granulated body as a negative electrode material, battery characteristics such as a load discharge characteristic may be even more improved.

After a surface of $SiO_y$ particles ($SiO_y$ composite particles or a granulated body of $SiO_y$ and a conductive material) is coated with a carbon material by vapor phase deposition, at least one organic compound selected from the group consisting of petroleum pitch, carbon pitch, thermosetting resin, and a condensate of naphthalenesulfonate and aldehydes may be made to stick to a coating layer including a carbon material, and then particles having the organic compound sticking thereto may be baked.

More specifically, a dispersion liquid having $SiO_y$ particles coated with a carbon material ($SiO_y$ composite particles or a granulated body of $SiO_y$ and a conductive material) and the above-described organic compound dispersed in a dispersion medium is prepared, the dispersion liquid is sprayed and dried to form particles coated with the organic compound, and the particles coated with the organic compound are baked.

The above-described pitch is for example isotropic pitch and the above described thermosetting resin is for example phenol resin, furan resin, and furfural resin. The above described condensate of naphthalenesulfonate and an aldehyde is for example a naphthalene sulfonate formaldehyde condensate.

A dispersion medium used to disperse $SiO_y$ particles coated with a carbon material and an organic compound may be for example water, an alcohol (ethanol) or the like. It is normally appropriate that the dispersion liquid is sprayed in an atmosphere at 50° C. to 300° C. The appropriate baking temperature is normally from 600° C. to 1200° C., and particularly preferably not less than 700° C., more preferably not less than 800° C. As the baking temperature is higher, fewer impurities remain and a coating layer including a highly conductive good quality carbon material can be formed. Note however that the baking temperature must be not more than the melting point of $SiO_y$.

The content of a $SiO_y$/carbon complex (a complex of $SiO_y$ and a carbon material) in a negative electrode active material is preferably not less than 0.01% by mass relative to 100% by mass of the negative electrode active material, more preferably not less than 3% by mass and not more than 20% by mass. The content being not less than 0.01% by mass allows the advantage of high capacity by the $SiO_y$/carbon complex to be provided and the content being not more than 20% by mass allows capacity deterioration in the entire negative electrode active material caused by repetitive charge/discharge to be reduced.

As a graphite material contained as the negative electrode active material other than $SiO_y$, any known substance used for a lithium rechargeable battery is preferably used, examples of which include natural graphite, pyrolytic carbons, MCMB, and easily graphitizable carbon such as carbon fiber after being graphitized at 2800° C. or higher.

It has been known that a rechargeable battery including $SiO_y$ as a negative electrode material has increased capacity and can be a high energy density battery. However, once metal ions elute out from the positive electrode side, the eluted metal ions selectively react with an alloy like SiO, so that the capacity of the alloy is degraded, which results in a reduction in the capacity during high temperature storage and degradation in the cycle characteristic. Instead of being used independently, $SiO_y$ is sometimes used together with graphite. If this is the case, even if the content of SiO in the negative electrode mixture is reduced, the contribution of energy density to the battery by SiO is high (which means that SiO contributes more to the increase in the capacity than graphite if their amounts are equal), there is a significant drop in the capacity.

However, the inclusion of an organic silane compound including a silane compound sulfur is believed to prevent elution of metal ions from the positive electrode which causes the drop. It has been found that during coating the positive electrode active material with an organic silane compound, $SiO_y$ contained in a negative electrode material in a particular range not only improves the stability of the positive electrode active material but also prevents reduction in the capacity of the battery during high temperature storage and the cycle characteristic can be kept in a high level.

As described above, $SiO_y$ is included in the negative electrode mixture as in a complex of $SiO_y$ and a carbon material, and the content of the complex of $SiO_y$ and the carbon material is preferably from 3% by weight to 20% by weight.

Within this range, the rechargeable battery has high energy density, there is neither reduction in the capacity nor retardation in the cycle characteristic during high temperature storage, and the swelling of the battery can be reduced.

A binder for the negative electrode mixture layer is any of the same kinds as those described as binders for the positive electrode mixture layer.

Any of various kinds of carbon black such as acetylene black and carbon nanotubes may be added to the negative electrode mixture layer.

The negative electrode may be produced by the steps of preparing a negative electrode mixture containing composition by dispersing for example a negative electrode active material and a binder and a conduction aid if necessary in a solvent such as N-methyl-2-pyrrolidone (NMP) and water (the binder may be dissolved in the solvent), applying this on one or both surfaces of a collector followed by drying, and carrying out calendaring if necessary. Note however that the negative electrode may be produced by a method other than the above.

The negative electrode mixture layer preferably has a thickness from 10 µm to 100 µm per surface of the collector, and the density of the negative electrode mixture layer (calculated based on the mass and thickness of the negative electrode mixture layer placed on the collector per unit area) is preferably from 1.0 $g/cm^3$ to 1.9 $g/cm^3$. As for the composition of the negative electrode mixture layer, for example, the amount of the negative electrode active material is preferably from 80% by mass to 95% by mass, the amount of the binder is preferably from 1% by mass to 20% by mass, and the amount of conduction aid if any is preferably from 1% by mass to 10% by mass.

As the negative electrode collector, a copper or nickel foil, a punching metal, a net, an expand metal or the like may be used, among which a copper foil is normally used. When the thickness of the entire negative electrode is reduced in order to obtain a high energy density non-aqueous rechargeable battery, the upper limit for the thickness of the negative electrode collector is preferably 30 µm, and the lower limit is desirably 5 µm for securing its mechanical strength.

A separator for use in a non-aqueous rechargeable battery according to the second embodiment is the same separator as that described in conjunction with the first embodiment. Note that in the second embodiment, a separator may be coated with an inorganic substance.

A non-aqueous electrolyte for use in a non-aqueous rechargeable battery according to the second embodiment is the same non-aqueous electrolyte described in conjunction with the first embodiment. An additive described in conjunction with the first embodiment may be added to the non-aqueous electrolyte in order to improve the properties of the non-aqueous rechargeable battery such as the stability, charge/discharge cycle characteristic, and high temperature storage performance, and fluoroethylene carbonate, difluoroethylene carbonate, triethyl phosphate, and triethyl phosphono acetate may be added to the non-aqueous electrolyte.

The non-aqueous rechargeable battery according to the second embodiment includes the positive electrode for a non-aqueous rechargeable battery, the negative electrode, the separator, and the non-aqueous electrolyte described above and has various kinds of arrangement described in conjunction with the first embodiment. The non-aqueous rechargeable battery according to the second embodiment is produced by the method described in conjunction with the first embodiment. When the non-aqueous rechargeable battery according to the second embodiment is produced using an outer can, an outer can made of stainless steel or aluminum is used.

The non-aqueous rechargeable battery according to the second embodiment includes a positive electrode for a non-aqueous rechargeable battery including elemental sulfur present in a layer between positive electrode active materials and a negative electrode including Si and O as constituent elements. This makes it difficult from metal ions from being eluted from the positive electrode for the non-aqueous rechargeable battery.

Therefore, deterioration in the capacity of the negative electrode can be reduced. Degradation in the non-aqueous rechargeable battery caused by the cycles can be reduced.

Inventive Examples

Now, the non-aqueous rechargeable battery according to the second embodiment will be described based on inventive examples. Note that the following inventive examples are not intended to restrict the present invention.

Inventive Example 14

Synthesizing Positive Electrode Active Material

A positive electrode active material having the same composition as that of the positive electrode active material according to Inventive Example 1 was synthesized by the same method of synthesizing the positive electrode active material according to Inventive Example 1.

Preparing Positive Electrode Material 100 parts by mass of the above-described positive electrode active material and 0.3 parts by mass of 3-mercaptopropyltrimethoxysilane as an organic silane compound including elemental sulfur were stirred for 30 minutes using a planetary mixer and a positive electrode material having a coating layer of the organic silane compound on a surface of the positive electrode active material was obtained.

Producing Positive Electrode

A positive electrode having the same composition as that of the positive electrode according to Inventive Example 1 was produced by the same method as the method of producing the positive electrode according to Inventive Example 1.

Producing Negative Electrode

SiO (average grain size: 5.0 μm) was heated to about 1000° C. in an ebullated bed reactor vessel and the heated particles were contacted with a 25° C. mixture gas of methane and nitrogen and subjected to vapor phase deposition at 1000° C. for 60 minutes. In this way, carbon generated as the mixture gas thermally decomposes (hereinafter also referred to as "CVD carbon") was deposited on a surface of the composite particles (SiO) to form a coating layer on the surface of the composite particles (SiO) and thus a negative material (carbon coated SiO) was obtained.

As a result of calculating the composition of the negative material based on changes in the mass before and after the coating layer was formed, it was found that SiO:CVD carbon=85:15 (mass ratio).

Then, using the negative electrode material and graphite, a negative electrode precursor sheet was produced. Five % by mass of carbon coated SiO (the content in the total amount of solid content; the same hereinafter) and 85% by mass of graphite, and 2% by mass of Ketjen black (average grain size: 0.05 μm) as a conduction aid, and 8% by mass of SBR and CMC (mass ratio=1:1) as a binder were mixed with water to prepare negative electrode mixture containing slurry.

Then, the negative electrode mixture containing slurry was applied on both surfaces of a copper foil as thick as 8 μm, dried in vacuum at 160° C. for 15 hours, and a negative electrode mixture layer was formed on both surfaces of the copper foil.

Then, pressing was carried out to adjust the thickness and density of the negative electrode mixture layer, a nickel lead was welded on an exposed part of the copper foil to produce a strip shaped negative electrode having a length of 380 mm and a width of 44 mm.

Adjusting Non-Aqueous Electrolyte

A non-aqueous electrolyte was adjusted by dissolving $LiPF_6$ in a concentration of 1 mol/L in a mixture solvent including EC, MEC, and DEC in a volume ratio of 2:3:1.

Assembling Battery

The above-describe strip-shaped positive electrode was placed on the strip shaped negative electrode and rolled through a microporous polyethylene separator (porosity: 41%) having a thickness of 16 μm and pressurized to be a flat rolled electrode member, and an end of the rolled electrode member was fixed with polypropylene insulating tape.

Then, the rolled electrode member was inserted into an aluminum alloy square battery case having a thickness of 4.6 mm, a width of 34 mm, and a height of 50 mm as an outer size, a lead member was welded, and an aluminum alloy lid plate was welded on the opening end of the battery case.

Then, a non-aqueous electrolyte was injected from an injection inlet provided at the lid plate and let to stand for 1 hour, then the injection inlet was sealed and a non-aqueous rechargeable battery with a structure as shown in FIGS. 1 and 2 and an appearance as shown in FIG. 3 was obtained. Note that the design electric capacity of the non-aqueous rechargeable battery was 1000 mAh.

Inventive Example 15

A positive electrode active material having the same composition as the positive electrode active material according to Inventive Example 2 was synthesized by the same method by which the positive electrode active material according to Inventive Example 2 was synthesized.

100 parts by mass of the positive electrode active material and 0.25 parts by mass of bis[3-(triethoxysilyl)propyl]tetrasulfide were stirred for 30 minutes using a planetary mixer and a positive electrode material having a coating layer of an organic silane compound including elemental sulfur formed on a surface of the positive electrode active material was produced.

Other than using the thus produced positive electrode material, a positive electrode for a non-aqueous rechargeable battery was produced in the same manner as Inventive Example 14 and other than using the produced positive electrode for a non-aqueous rechargeable battery, a non-aqueous rechargeable battery was produced in the same manner as that according to Inventive Example 14.

Inventive Example 16

Except that 1.0 part by mass of 3-mercaptopropylmethyldimethoxysilane relative to 100 parts by mass of the positive electrode active material was used, a positive electrode material was prepared in the same manner as that according to Inventive Example 14.

Except that the prepared positive electrode was used, a positive electrode was produced in the same manner as that according to Inventive Example 14, and except that the thus produced positive electrode was used, a non-aqueous rechargeable battery was produced in the same manner as that according to Inventive Example 14.

Inventive Example 17

Except that the composition of a coprecipitation compound was changed, a positive electrode active material represented by $Li_{1.02}Ni_{0.90}Co_{0.05}Mn_{0.03}Mg_{0.02}O_2$ was synthesized using the same positive electrode active material as that according to Inventive Example 11. The specific surface area of the positive electrode active material was determined to be 0.4 $m^2/g$.

100 parts by mass of the positive electrode active material and 0.7 parts by mass of 3-mercaptopropylmethoxysilane as an organic silane compound including elemental sulfur were stirred for 30 minutes using a planetary mixer, and a positive electrode material having a coating layer of the organic silane compound including elemental sulfur on a surface of the positive electrode active material was obtained.

Except that the above positive electrode material was used, a positive electrode was produced in the same manner as that according to Inventive Example 14, and except that the thus formed positive electrode was used, a non-aqueous rechargeable battery was produced in the same manner as that according to Inventive Example 14.

Inventive Example 18

30 parts by mass of $Li_{1.02}Ni_{0.90}Co_{0.05}Mn_{0.03}Mg_{0.02}O_2$ that was the positive electrode active material used according to Inventive Example 17, 70 parts by mass of $LiCoO_2$, and 0.3 parts by mass of bis[3-(triethoxysilyl)propyl]tetrasulfide as an organic silane compound including elemental sulfur were stirred for 30 minutes using a planetary mixer, and a positive electrode material having a coating layer of the organic silane compound including elemental sulfur was produced on a surface of the positive electrode active material. Note that the titer of $Li_{0.02}Ni_{0.90}CO_{0.05}Mn_{0.03}Mg_{0.02}O_2$ was 43.0 ml, and the specific surface area was 0.3 $m^2/g$.

Except that this positive electrode material was used, a positive electrode was produced in the same manner as that according to Inventive Example 14, and except that the thus produced positive electrode was used, a non-aqueous rechargeable battery was produced in the same manner as that according to Inventive Example 14.

Inventive Example 19

Except that $Li_{1.02}Ni_{0.6}Mn_{0.20}CO_{0.20}O_2$ used in Inventive Example 1 was used instead of $Li_{1.02}Ni_{0.90}Co_{0.05}Mn_{0.03}Mg_{0.02}O_2$ used in Inventive Example 11, a positive electrode was produced in the same manner as that in Inventive Example 18 and except that the thus produced positive electrode was used, a non-aqueous rechargeable battery was produced in the same manner as that in Inventive Example 18. Note that the titer of $Li_{1.02}Ni_{0.6}Mn_{0.20}Co_{0.20}O_2$ was 5.6 ml, and the specific surface area was 0.2 $m^2/g$.

Inventive Example 20

Except that the content of carbon coated SiO in the negative electrode mixture was 3% by mass and the content of graphite was 87% by mass, a negative electrode was produced in the same manner as that in Inventive Example 14, and except that the thus produced negative electrode was used, a non-aqueous rechargeable battery was produced in the same manner as that according to claim 14.

Inventive Example 21

Except that the content of the carbon coated SiO in the negative electrode mixture was 20% by mass and the content of graphite was 70% by mass, a negative electrode was produced in the same manner as that in Inventive Example 14, and except that the produced negative electrode was used, a non-aqueous rechargeable battery was produced in the same manner as that in Inventive Example 14.

Comparative Example 5

Except that the content of carbon coated SiO in the negative electrode mixture was 40% by mass and the content of graphite was 50% by mass, a negative electrode was produced in the same manner as that in Inventive Example 14, and except that the thus produced negative electrode was used, a non-aqueous rechargeable battery was produced in the same manner as that according to Inventive Example 14.

Comparative Example 6

Except that the content of carbon coated SiO in the negative electrode mixture was 1% by mass and the content of graphite was 89% by mass, a negative electrode was produced in the same manner as that according to Inventive Example 14, and except that the thus produced negative electrode was used, a non-aqueous rechargeable battery was produced in the same manner as that according to Inventive Example 14.

Comparative Example 7

Except that a positive electrode was produced without adding an organic silane compound, a positive electrode was produced in the same manner as that according to Inventive Example 14, and except that the thus produced positive electrode was used, a non-aqueous rechargeable battery was produced in the same manner as that according to Inventive Example 14.

Comparative Example 8

Except that a positive electrode was produced without adding an organic silane compound, a positive electrode was produced in the same manner as Inventive Example 15, and except that the thus produced positive electrode was used, a non-aqueous rechargeable battery was produced in the same manner as Inventive Example 14.

The non-aqueous rechargeable batteries according to Inventive Examples 14 to 21 and Comparative Examples 5 to 8 and the positive electrode mixture containing compositions used for producing these non-aqueous rechargeable batteries were evaluated as follows. The result is given in Table 2. The amount of each organic silane compound relative to 100 parts by mass of the positive electrode active material in the positive electrode material (as "organic silane compound addition amount" in Table 2) is also included.

Capacity Measurement

The batteries according to Inventive Examples 14 to 21 and Comparative Examples 5 to 8 were stored for 7 hours at 60° C. and then a charge/discharge cycle in which the batteries were charged at 200 mA for 5 hours and then discharged until the battery voltage dropped to 2.5 V was repeated at 20° C. until the discharge capacity reaches a prescribed level. Then, constant current/constant voltage charge (constant current: 500 mA, constant voltage: 4.2 V, total charge time: 3 hours) was carried out, the batteries were allowed to rest for 1 hour and then discharged at a current value of 200 mA until the battery voltage reached 2.5 V to obtain standard capacities. Note that the standard capacity was measured for 100 batteries for each kind of batteries, and the average value was determined as a standard capacity for each of the inventive examples and comparative examples.

Storage Characteristic

The batteries according to Inventive Examples 14 to 21 and Comparative Examples 5 to 8 were subjected to constant current/constant voltage charge (constant current: 500 mA, constant voltage: 4.2 V, total charge time: 3 hours) and then let to stand for 5 days at 80° C. in a constant temperature oven, and then the thickness of each of the batteries was measured. The difference between the thickness of each of the batteries thus obtained and their thickness before storage (4.6 mm) was determined as the swelling of the battery during storage. Then, the batteries after the storage were discharged at a current value of 200 mA until the battery voltage dropped to 2.5 V, and the capacity after the storage was obtained. The capacity retention ratio after the storage was obtained as post storage capacity retention ratio=(capacity after storage/standard capacity)×100.

Charge Discharge Cycle Characteristic

A charge/discharge cycle was repeated, in which the batteries according to the batteries according to Inventive Examples 14 to 21 and Comparative Examples 5 to 8 were subjected the constant current/constant voltage charge in the same conditions as those for measuring the standard capacities, then allowed to rest for 1 minute, and then the charged with a current value of 200 mA until the battery voltage dropped to 2.5 V. Then, the number of cycles until the discharge capacity dropped to 60% of the initial discharge capacity was obtained to evaluate the charge/discharge cycle characteristic. Note that the cycle number in the charge/discharge characteristic was measured for 10 batteries for each kind of batteries, and the average value was determined as a cycle number for each of the inventive examples and comparative examples.

Evaluating Stability of Positive Electrode Mixture Containing Compositions

The positive electrode mixture containing compositions used to produce the batteries according to Inventive Examples 14 to 21 and Comparative Examples 5 to 8 were measured for changes in the viscosity over time, based on which the stability of each of the positive electrode mixture containing compositions was evaluated. More specifically, the positive electrode mixture containing compositions were evaluated for their viscosities by comparing the viscosity immediately before their preparation and the viscosity after being stored while being rotated at room temperatures for 1 week using a mix rotor. The compositions that had maintained the viscosities after the storage are expressed by ⊚, and those with significantly increased viscosities after the storage are expressed by x.

TABLE 2

| | Standard capacity (mAh) | Organic silane compound addition amount (mass %) | Swell after storage (mm) | Capacity retention ratio after storage (%) | Cycle retention number (number of times) | Positive electrode paint stability | Content of complex of SiO$_y$ & carbon material in negative electrode mixture (mass %) | Organic silane compound |
|---|---|---|---|---|---|---|---|---|
| I. Example 14 | 990 | 0.3 | 0.85 | 65 | 450 | ⊚ | 5 | 3-mercaptopropyltrimethoxysilane |
| I. Example 15 | 1050 | 0.25 | 0.9 | 65 | 410 | ⊚ | 5 | bis[3-(triethoxysilyl)propyl]tetrasulfide |
| I. Example 16 | 980 | 1.0 | 0.8 | 65 | 460 | ⊚ | 5 | 3-mercaptopropylmethyldimethoxysilane |
| I. Example 17 | 1090 | 1 | 0.9 | 65 | 400 | ⊚ | 5 | 3-mercaptopropyltrimethoxysilane |
| I. Example 18 | 980 | 1 | 0.75 | 65 | 470 | ⊚ | 5 | bis[3-(triethoxysilyl)propyl]tetrasulfide |
| I. Example 19 | 920 | 0.7 | 0.7 | 65 | 510 | ⊚ | 5 | bis[3-(triethoxysilyl)propyl]tetrasulfide |
| I. Example 20 | 950 | 0.3 | 0.75 | 70 | 470 | ⊚ | 3 | 3-mercaptopropyltrimethoxysilane |
| I. Example 21 | 1030 | 0.3 | 0.95 | 60 | 400 | ⊚ | 20 | 3-mercaptopropyltrimethoxysilane |
| C. Example 5 | 1040 | 0.3 | 1.5 | 25 | 150 | ⊚ | 40 | 3-mercaptopropyltrimethoxysilane |
| C. Example 6 | 900 | 0.3 | 0.7 | 40 | 250 | ⊚ | 1 | 3-mercaptopropyltrimethoxysilane |
| C. Example 7 | 1000 | 0 | 1.2 | 50 | 380 | x | 5 | None |
| C. Example 8 | 1060 | 0 | 1.3 | 50 | 350 | x | 5 | None |

The non-aqueous rechargeable batteries according to Inventive Examples 13 to 18 each produced using a positive electrode produced with a positive electrode material having a coating layer of an organic silane compound including elemental sulfur on a surface of lithium nickel composite oxide as a positive electrode active material had only small swelling after the storage test, a high capacity retention ratio and a good high temperature storage property. The non-aqueous rechargeable batteries according to Inventive Examples 13 to 18 had good performance related to the cycle characteristic. The non-aqueous rechargeable batteries according to Inventive Examples 13 to 18 had high stability for the positive electrode mixture containing compositions, and gelation was suppressed from proceeding. Therefore, the non-aqueous rechargeable batteries according to Inventive Examples 13 to 18 had high productivities.

On the other hand, the non-aqueous rechargeable battery according to Comparative Example 5 had large swelling after the storage and the capacity retention ratio after the storage and the cycle retention number were reduced.

The non-aqueous rechargeable battery according to Comparative Example 6 had a small standard capacity, and this is because its content of SiO is small. The non-aqueous rechargeable battery according to Comparative Example 6 had a reduced capacity retention ratio after the storage and a reduced cycle retention number. This is because of metal Li precipitated at the negative electrode.

It is believed that since the non-aqueous rechargeable batteries according to Comparative Examples 7 and 8 did not contain an organic silane compound in the positive electrodes, gas was generated and the batteries were swollen. In the non-aqueous rechargeable batteries according to Comparative Examples 7 and 8, the capacity retention ratio and the cycle retention number were reduced. In addition, the non-aqueous rechargeable batteries according to Comparative Examples 7 and 8 had increased viscosities after the storage in the stability evaluation of the positive electrode mixture containing compositions and gelation had proceeded for the short period of time.

As for the other part of the second embodiment, the description of the first embodiment applies.

In the first embodiment described above, the positive electrode material had a surface of its positive electrode active material coated with a coating layer of an organic silane compound.

In the second embodiment described above, the positive electrode material had a surface of its positive electrode active material coated with a coating layer of an organic silane compound including elemental sulfur, or with a coating layer of an organic sulfur compound including elemental sulfur.

Therefore, it is only necessary for the positive electrode material according to the embodiment of the invention to have a surface of the positive electrode active material coated with a coating layer of an organic compound.

In the description of the first embodiment, a method of producing a positive electrode material includes the steps of adjusting the remaining amount of an alkaline component of a lithium nickel composite oxide represented by the general compositional formula (1) so that a titer determined by titrating the supernatant of a mixture produced by mixing and stirring 20 g of the oxide and 100 ml of pure water in a nitrogen atmosphere for 1 hour with 20 mol/l hydrochloric acid is in the range from 0.5 ml to 150 ml and forming a coating layer of an organic silane compound on a surface of the lithium nickel composite oxide in which the remaining amount of the alkaline component is adjusted.

Furthermore, in the description of the second embodiment, a method of producing a positive electrode material includes the steps of adjusting the remaining amount of an alkaline component of the lithium nickel composite oxide represented by the general compositional formula (1) so that a titer determined by titrating the supernatant of a mixture produced by mixing and stirring 20 g of the oxide and 100 ml of pure water in a nitrogen atmosphere for 1 hour with 0.2 mol/l hydrochloric acid is in the range from 0.5 ml to 150 ml and forming a coating layer of an organic silane compound including elemental sulfur or an organic compound including elemental sulfur on a surface of the lithium nickel composite oxide in which the remaining amount of the alkaline component is adjusted.

Therefore, it is only necessary that a method of producing a positive electrode material according to an embodiment of the invention includes the steps of adjusting the remaining amount of an alkaline component of a lithium nickel composite oxide represented by the general compositional formula (1) so that a titer determined by titrating the supernatant of a mixture obtained by mixing and stirring 20 g of the oxide and 100 ml of pure water in a nitrogen atmosphere for 1 hour with 0.2 mol/l hydrochloric acid is in the range from 0.5 ml to 150 ml and forming a coating layer of an organic compound on a surface of a lithium nickel composite oxide in which the remaining amount of the alkaline component is adjusted.

It should be understood that the embodiments disclosed herein are illustrative in every aspect and not restrictive. The scope of the invention is defined by the appended claims rather than by the description preceding them, and all modifications that fall within the scope of claims and equivalence thereof are intended to be embraced by the claims.

APPLICABILITY IN THE INDUSTRY

The present invention is applied to a positive electrode material, a manufacturing method thereof, a positive electrode for a non-aqueous rechargeable battery, and a non-aqueous rechargeable battery.

The invention claimed is:

1. A positive electrode material for use in a positive electrode for a non-aqueous rechargeable battery, comprising:
a positive electrode active material including a lithium nickel composite oxide represented by the following general compositional formula (1);
a coating layer formed on a surface of said positive electrode active material and made of an organic compound;
an alkaline component having a content of 0.22% to 2%; and
when the supernatant of a mixture obtained by mixing and stirring 20 g of the positive electrode active material and 100 ml of pure water in a nitrogen atmosphere for 1 hour is titrated with 0.2 mol/l hydrochloric acid, a titer is from 9.3 to 103.2 ml;

$$Li_{1+x}MO_2 \qquad (1)$$

where $-0.5 \leq x \leq 0.5$, M represents a group of at least two elements including at least one of Mn and Co and Ni and $20 \leq a < 100$ and $50 \leq a+b+c \leq 100$ when the ratios (mol %) of Ni, Mn and Co in the elements forming M are a, b, and c, respectively.

2. The positive electrode material according to claim 1, wherein said organic compound is an organic silane compound.

3. The positive electrode material according to claim 1, wherein the organic compound has a content of 0.01 to 20 parts by mass relative to 100 parts by mass of the positive electrode active material.

4. The positive electrode material according to claim 3, wherein A/B is from 0.01 to 50 when the amount of said organic compound relative to 100 parts by mass of said positive electrode active material is A (parts by mass) and the specific surface area of said positive electrode active material is B ($m^2/g$).

5. The positive electrode material according to claim 1, wherein M further includes at least one of Al, Mg, Ti, Ba and Fe in the general compositional formula (1) in said positive electrode active material.

6. The positive electrode material according to claim 5, wherein $d \leq 10$, $e \leq 10$, $f \leq 50$, $g \leq 10$ and $h \leq 50$ when the ratios (mol %) of Al, Mg, Ti, Ba and Fe in the elements that form M are d, e, f, g, and h, respectively.

7. The positive electrode material according to claim 2, further comprising elemental sulfur included in a layer between said positive electrode active material.

8. A positive electrode for a non-aqueous rechargeable battery, comprising:
a positive electrode collector; and
a positive electrode mixture layer formed on a surface of said positive electrode collector and including the positive electrode material according to claim 7 and a binder.

9. A positive electrode for a non-aqueous rechargeable battery, comprising:
a positive electrode collector; and
a positive electrode mixture layer formed on a surface of said positive electrode collector and including the positive electrode material according to claim 1 and a binder.

10. A non-aqueous rechargeable battery, comprising:
the positive electrode for a non-aqueous rechargeable battery according to claim 9;
a negative electrode; and
a non-aqueous electrolyte.

11. A non-aqueous rechargeable battery, comprising:
the positive electrode for a non-aqueous rechargeable battery according to claim 8;
a negative electrode; and
a non-aqueous electrolyte.

12. The non-aqueous rechargeable battery according to claim 11, wherein said negative electrode comprises:
a complex including a negative electrode material that includes Si and O as constituent elements and a carbon material where the atomic ratio y of O relative to Si satisfies $0.5 \leq y \leq 1.5$; and
graphite.

13. The positive electrode material according to claim 1, wherein said a satisfies $50 \leq a < 100$.

* * * * *